US008170904B1

(12) United States Patent
De Moraes et al.

(10) Patent No.: US 8,170,904 B1
(45) Date of Patent: May 1, 2012

(54) APPARATUS, METHOD AND SYSTEM FOR COMPARATIVE COLLABORATIVE CREATIVE WORKS EVALUATION

(76) Inventors: Andre De Moraes, Kearny, NJ (US); Sandro De Moraes, Kearny, NJ (US)

( * ) Notice: Subject to any disclaimer, the term of this patent is extended or adjusted under 35 U.S.C. 154(b) by 1442 days.

(21) Appl. No.: 10/632,392

(22) Filed: Aug. 1, 2003

Related U.S. Application Data

(60) Provisional application No. 60/400,582, filed on Aug. 2, 2002.

(51) Int. Cl.
*G06Q 90/00* (2006.01)
(52) U.S. Cl. .......................................... 705/7.29; 705/12
(58) Field of Classification Search .................... 705/12, 705/7.29
See application file for complete search history.

(56) References Cited

U.S. PATENT DOCUMENTS

| 5,916,024 | A  * | 6/1999 | Von Kohorn ..................... 463/40 |
| 6,578,008 | B1 * | 6/2003 | Chacker .......................... 705/12 |
| 6,993,496 | B2 * | 1/2006 | Pittelli ............................. 705/10 |
| 7,087,829 | B2 * | 8/2006 | Hasegawa et al. .............. 84/609 |
| 7,162,433 | B1 * | 1/2007 | Foroutan ......................... 705/11 |
| 2002/0065097 | A1 * | 5/2002 | Brockenbrough et al. ... 455/552 |
| 2003/0171982 | A1 * | 9/2003 | Paul ................................. 705/12 |
| 2003/0190960 | A1 * | 10/2003 | Jokipii et al. ................... 463/42 |

OTHER PUBLICATIONS

RapBattles.com website, www.rapbattles.com, retrieved from www.archive.org in Nov. and Dec. 2001.*

* cited by examiner

*Primary Examiner* — Neil Kardos
(74) *Attorney, Agent, or Firm* — Walter G. Hanchuk; Chadbourne & Parke LLP

(57) ABSTRACT

An apparatus, method, and system for a comparative, collaborative, creative works evaluator (3CWE). One of the benefits of 3CWE is that it provides a mechanism to rate and subsequently rank creative works and their authors. The benefits of ranking creative works and their authors are many, one of which is to provide audiences with guidance as to the quality and/or popularity of a given author or work. As such, the system provides and may act as a more accurate promotional vehicle in identifying and uncovering talent. This 3CWE system allows individuals without the standard resources to be recognized by an internationally-targeted market. By evaluating creative artists and works by interested participants, the artists and works' exposure is expanded. In one, non-limiting example, present, inventive aspect of the disclosure provides a system that pits creative works, and as a consequence, their authors, against one another for evaluation by an audience.

209 Claims, 26 Drawing Sheets

Battling Overview

1. S tup Battle

3. Op n Battle

4. Close Battle

Daily Processes a) Prevent Incomplete Battles From Opening

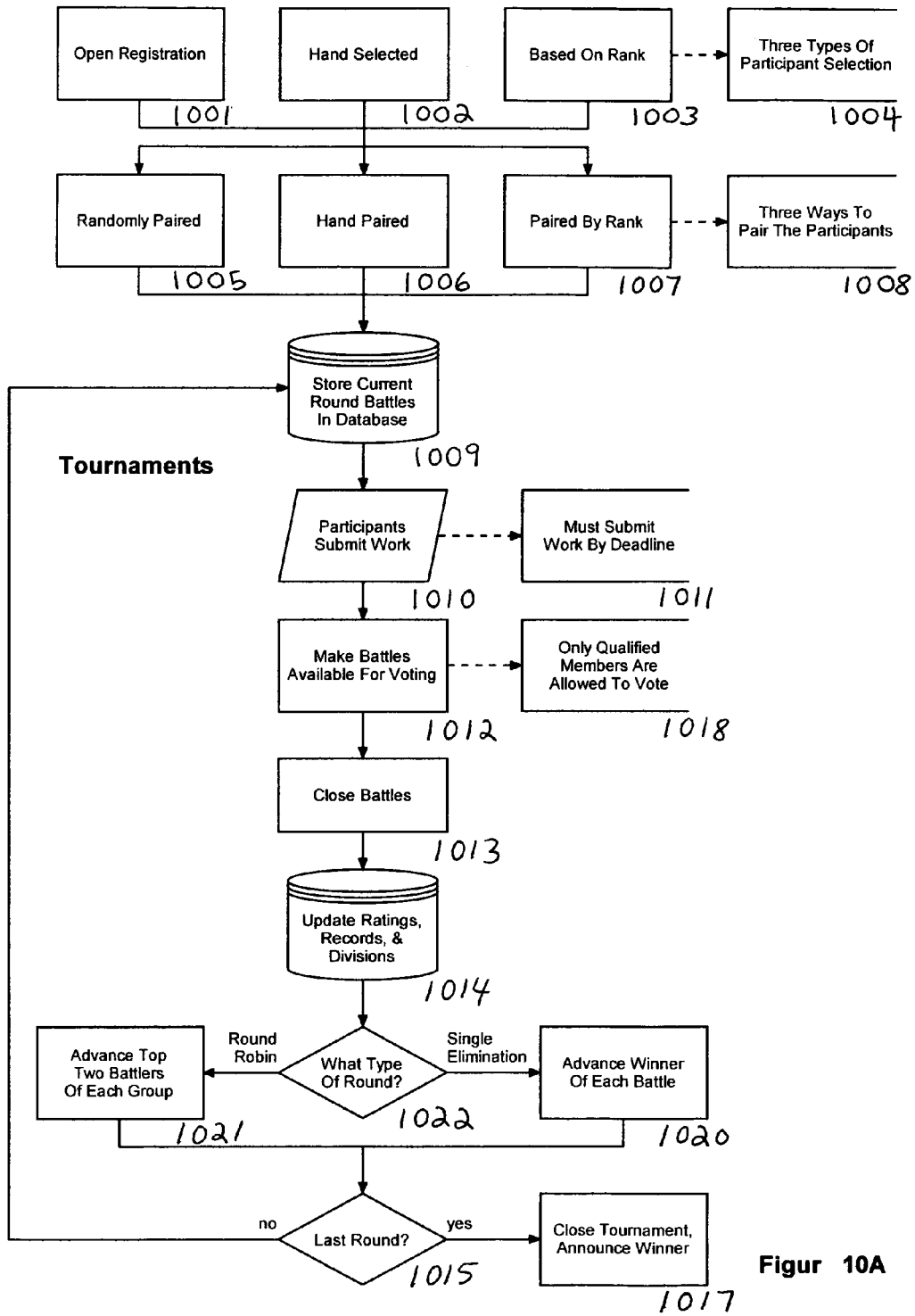
Figur 10A

Tournament Participants: Open Registration

Tournament Participants: Hand Selecti n

Tournament Battler Pairing a) Staff Pairs b) Members Pair

Battl Voting openmic home   my profile   emcees   chat   battles   tourneys   help

Battles Manage your battles   Messages Manage private msgs   Profile Update your profile   Preferences Set your preferences

Your Recent Battles

| Opponent | Status | Score | |
|---|---|---|---|
| Crew Battles | | | |
| 1. Dynasty Warriors | Losing | 3-0 | view |
| Regular Battles | | | |
| 1. Complex Verse | 07-18-2002 | 0-0 | edit |
| 2. starshine | Won | 0-11 | view |
| 3. DNoe | Tied | 3-3 | view |
| 4. neptune | Lost | 6-4 | view |

Your Tournament Battles

| Opponent | Status | Round | Score | |
|---|---|---|---|---|
| 3rd Openmic Lyrical Tournament, Topical | | | | |
| 1. Intro | Lost | 4 | 5-22 | view |

Emcees Challenging You

| Opponent | Deadline | Length | |
|---|---|---|---|
| 1. AssasiNATION | 07-20-2002 | 20 lines | respond |

Emcees You Are Challenging

| Opponent | Deadline | Length | Status |
|---|---|---|---|
| 1. Konquest | 03-07-2002 | 12 lines | declined |
| 2. TheMyT | 12-27-2001 | 16 lines | expired |
| 3. javig2S | 10-28-2001 | 20 lines | accepted | figure 13 openmic

*home     my profile     emcees     chat     battles     tourneys     help*

Battles Manage your battles    Messages Manage private msgs    Profile Update your profile    Preferences Set your preferences

Mr.Capazealow vs. ~StreetBoy~

Deadline: 07-25-2002                                    preview
(lyrics/audio will be automatically posted at midnight Eastern time)
Type: Lyrical
Length: 16 Lines
Lyrics:

5000 characters max

☐ Done save changes | exit figure 14 openmic home    my profile    emcees    chat    battles    tourneys    help

Battles Manage your battles    Messages Manage private msgs    Profile Update your profile    Preferences Set your preferences

Challenge From Abzolute_Xero

Type: Lyrical
Max Length: 16 Lines
Deadline: 07-22-2002
Message: Hi, I'm looking for someone to battle. I want to see how well I do against other UK emcees so accept this challenge if you would like to battle me. Bye.

Response: ● Accept ○ Decline
Message: Ok, let's battle. I'm accepting your challenge. Good luck.

300 characters max send response | back figure 15

| Coming Soon Battles | | |
| --- | --- | --- |
| Emcees | Type | Posting Deadline |
| 1. TheMyT (0) vs. (0) cataztrophy | Audio | 02-07-2002 coming soon |
| 2. mdiddy (0) vs. (0) DJ.will | Lyrical | 02-07-2002 coming soon |
| 3. y2hustla (0) vs. (0) Tornado | Lyrical | 02-07-2002 coming soon |
| 4. lyrical beast (0) vs. (0) illizit | Lyrical | 02-07-2002 coming soon |
| 5. The Janitor (0) vs. (0) Rabelais | Lyrical | 02-07-2002 coming soon |
| 6. MC SabI (0) vs. (0) Cellsiuz | Lyrical | 02-07-2002 coming soon |
| 7. thissomeshit (0) vs. (0) FuZed SkillZ | Lyrical | 02-07-2002 coming soon |
| 8. EJ (0) vs. (0) And1XplIcIt | Lyrical | 02-07-2002 coming soon |
| 9. HyPnOtIk Dream (0) vs. (0) AzainAddiction | Lyrical | 02-07-2002 coming soon |
| 10. sel (0) vs. (0) HoT SaUcE | Lyrical | 02-07-2002 coming soon |
| 11. TOSTA (0) vs. (0) T-Dogg | Lyrical | 02-07-2002 coming soon |
| 12. Yungfya (0) vs. (0) J-Bonez | Lyrical | 02-07-2002 coming soon |
| 13. CeCe (0) vs. (0) skittles | Lyrical | 02-07-2002 coming soon |
| 14. Sultan (0) vs. (0) The Last Poet | Audio | 02-07-2002 coming soon |
| 15. SliffRiffkin (0) vs. (0) y2hustla | Lyrical | 02-07-2002 coming soon |
| 16. sincere (0) vs. (0) AzainAddiction | Lyrical | 02-07-2002 coming soon |
| 17. TRIGGA HAPPY (0) vs. (0) cataztrophy | Lyrical | 02-08-2002 coming soon |
| 18. Fogtree33 (0) vs. (0) TwIsTeDbRiLlIaNcE | Lyrical | 02-08-2002 coming soon |
| 19. K-aoz (0) vs. (0) Masta Blend | Lyrical | 02-08-2002 coming soon |
| 20. Night Train (0) vs. (0) y2hustla | Lyrical | 02-08-2002 coming soon |

Figure 16

| Recently Closed Battles | | |
|---|---|---|
| Emcees | Type | Voting Deadline |
| 1. EXCLUSIVE (3) vs. (10) lyrical beast | Lyrical | 02-06-2002 closed |
| 2. Camilean (12) vs. (13) Tornado | Lyrical | 02-06-2002 closed |
| 3. Mr.Capazealow (10) vs. (0) lyrical beast | Lyrical | 02-06-2002 closed |
| 4. premium (4) vs. (8) Apexxx | Lyrical | 02-06-2002 closed |
| 5. lady b-more (1) vs. (11) FeAhnna Blue | Lyrical | 02-06-2002 closed |
| 6. Kero (1) vs. (0) Darkn1 | Lyrical | 02-06-2002 closed |
| 7. WindbrookeJefe (7) vs. (0) LaDy JOkER | Lyrical | 02-06-2002 closed |
| 8. Camilean (7) vs. (8) y2hustla | Lyrical | 02-06-2002 closed |
| 9. young balla (2) vs. (3) whiz | Lyrical | 02-06-2002 closed |
| 10. y2hustla (6) vs. (1) double R | Lyrical | 02-06-2002 closed |
| 11. Narcissus (2) vs. (7) sincere | Lyrical | 02-06-2002 closed |
| 12. lil g moe (3) vs. (7) LaDy JOkER | Lyrical | 02-06-2002 closed |
| 13. KK (1) vs. (5) SUPREMCEE | Lyrical | 02-06-2002 closed |
| 14. scrilium (2) vs. (10) Verbal Remedy | Lyrical | 02-06-2002 closed |
| 15. Camilean (4) vs. (10) FeAhnna Blue | Lyrical | 02-06-2002 closed |
| 16. Mr.Capazealow (9) vs. (8) lil krik | Lyrical | 02-06-2002 closed |
| 17. H2o Milagro (2) vs. (1) K-Boy Killa | Lyrical | 02-06-2002 closed |
| 18. HyPnOtIk Dream (1) vs. (3) hYpNoTiKz | Lyrical | 02-06-2002 closed |
| 19. buickboy (3) vs. (8) Camilean | Lyrical | 02-06-2002 closed |
| 20. buickboy (7) vs. (0) DJ danger | Lyrical | 02-06-2002 closed |
| 21. Masta Blend (5) vs. (4) Reality | Lyrical | 02-06-2002 closed |
| 22. tim nugzz (0) vs. (1) ALIAS | Lyrical | 02-06-2002 closed |
| 23. REALIZE (4) vs. (3) bobbychromatic | Lyrical | 02-06-2002 closed |
| 24. H2o Milagro (4) vs. (2) selo | Lyrical | 02-06-2002 closed |
| 25. J-God (1) vs. (0) luda | Lyrical | 02-06-2002 closed | figure 17

OPEN openmic home   my profile   emcees   chat   battles   tourneys   help

Top 40 Emcees

The following emcees are currently the 40 highest rated emcees at Openmic. Over time, this chart will become a very accurate reflection of our most talented members.

Top 40 Rated Emcees

| Emcee | Country | Hometown | Crew | Rating |
|---|---|---|---|---|
| 1. FuZed SkillZ | | Bristol, UK | Do or Die | 1890 |
| 2. Profound | | Bronx 2 Miami, !! | Sick Mentalz | 1889 |
| 3. urotsukidoji | | London, UK | Urban Organix | 1836 |
| 4. Re-Dogg | | 8-dot, ON, CN | Do or Die | 1808 |
| 5. URSA MAJOR | | Philadelphia, PA | H.U.N.G.E.R. | 1803 |
| 6. Intro | | Guelph, ON, Cn | Sick Mentalz | 1796 |
| 7. S.T.E.E.L. | | Metairie, LA | Konquest | 1782 |
| 8. TraGic-1 | | Bloomingburg, NY | Openmic Vandals | 1777 |
| 9. whiz | | Euphoria, VA | H.U.N.G.E.R. | 1777 |
| 10. Perplex | | Calgary, CN | none | 1770 |
| 11. twin terror | | Cerritos, Ca | H.U.N.G.E.R. | 1770 |
| 12. SYN_D | | Tampa, FL | AssasiNATION | 1765 |
| 13. DiSSaster | | Detroit, MI | Incendiary Squad | 1759 |
| 14. Chope | | Arkham Asylum, ?? | Skyllables | 1752 |
| 15. GEMINIGH | | Detroit, MI | Incendiary Squad | 1752 |
| 16. J-Himself | | Greensboro, NC | None | 1750 |
| 17. Jay Barz | | Tacoma, WA | K.O.P.S. | 1749 |
| 18. The Lyrical Venom | | Cleveland, OH | L.A.W.W. | 1737 |
| 19. UltraViolent | | MTL. & Baltimore,, MD | none | 1733 |
| 20. VeRbAl EcLiPsE | | San Antonio, TX | None | 1730 |
| 21. T-Dogg | | Derby, UK | Do or Die | 1729 |
| 22. NOLA | | Planet Earth, MW | ~NONE NEEDED~ | 1729 |
| 23. DNoe | | Ft Collins, CO | Konquest | 1725 |

Figure 18 openmic home    my profile    emcees    chat    battles    tourneys    help

Emcee Browse by emcee    Crew Browse by crew    City Browse by city    Rating Browse by rating    Division Browse by division US: AL AK AZ AR CA CO CT DE FL GA HI ID IL IN IA KS KY LA ME MD MA MI MN MS MO MT NE NV NH NJ NM NY NC ND OH OK OR PA RI SC SD TN TX UT VT VA WA WV WI WY Other: CANADA UK AUSTRALIA GERMANY NETHERLANDS FINLAND SWEDEN

GE

Berlin - 1                Gd Saconnex - 1        Germany - 1
Germany (org. N.j) - 1    Heidelberg - 2         Siegsdorf - 1

◀ prev  1  next ▶ figure 19 openmic home     my profile     emcees     chat     battles     tourneys     help

---

Doc (6) vs. Swift Rock (0)

Type: Audio
Length: 4 Minutes
Deadline: Closed (07-15-2002)

Swift Rock: http://www.soundclick.com/util/streamM3U.m3u?ID=66001&q=Hi ok you said this is a collab battle..well this is the only thing i have on computer..so here it is...

Doc: http://www.soundclick.com/util/streamM3U.m3u?ID=93273&q=Hi

*Topical Battle*

Okay, Hope you all like this track. Just finished it last weekend, it's tight..another Gangsta Track. Well I hope ya dig it.

In Order Of Apperence

First*Me, Second*J-Chrizt, Third*F.R.E.E. Linx, Mafioso's

---

Vote For: ○ S.T.E.E.L.    ● Doc    ○ Comment Only

Comments:
```
Gotta give it to Doc on this one... he had very nice delivery...
Swift's was ok but he was hesitating at times.

Was also feeling Doc's lyrics more... nice audio dawg.
```
1000 characters max vote now | back

---

LivingLegend: Voted for: Doc

Swift....you was aight, beat was dull though...good flow, nice wordplay

Back In Da Mix, And Trynna Climb.

⋮

Re-Dogg: Voted for: Comment Only

LMAO @ BrtZZZ comment

Strickly audio, all text challenges will get declined figure 20 da gr8 wuhn: Voted for: KK

---

DA GR8 WUHN U BASTARDS don't get it TWISTED/I'm THE GREAT ONE u dumb fuks just incase u MISSED IT/I'll lyrically asassinate u wit this 2 piece and BIZKIT/I'll leave stumps on ure arms right about where u WRIST IS/Exept my challeges , cause u already lost and u got nothing else to RISK KID......

-sTaTuS-: Voted for: KK

---

Mu'PhuKkaZ NeeD 2 PrePaRe..
FrosTy Fo'Z in This
ainT No~joKe..

y2hustla: Voted for: Comment Only

---

REALIZE: Voted for: KK

HAHAHA neigh thats a funny verse but.

Figure 21

OPEN openmic home    my profile    emcees    chat    battles    tourneys    help

| CREW | DIVISION 1 | DIVISION 2 | DIVISION 3 | NEWBIES |

Open Battles

| Emcees | Type | Voting Deadline | |
|---|---|---|---|
| 1. Realize (2) vs. (0) Bobo | Lyrical | 07-18-2002 | vote now |
| 2. SYN_D (0) vs. (4) Problem | Lyrical | 07-18-2002 | vote now |
| 3. KriminaL InstincZ (8) vs. (9) one_der | Lyrical | 07-18-2002 | vote now |
| 4. Re-Dogg (6) vs. (9) Wicked | Lyrical | 07-18-2002 | vote now |
| 5. Rahmatic Cadmus (1) vs. (3) RoyJonesJr | Lyrical | 07-18-2002 | vote now |
| 6. S.T.E.E.L. (5) vs. (3) Swift Rock | Audio | 07-19-2002 | you—voted |
| 7. lyrikill_purist (1) vs. (0) KriminaL InstincZ | Lyrical | 07-19-2002 | vote now |
| 8. KriminaL InstincZ (1) vs. (1) Wicked | Lyrical | 07-20-2002 | vote now |
| 9. neptune (0) vs. (3) ASIATICLION | Audio | 07-20-2002 | you—voted |
| 10. Wicked (2) vs. (0) { * tHe TrUtH * } | Lyrical | 07-21-2002 | vote now |

Recently Closed Battles

| Emcees | Type | Voting Deadline | |
|---|---|---|---|
| 1. Renegade (6) vs. (9) lyrikill_purist | Lyrical | 07-17-2002 | closed |
| 2. Sensational (11) vs. (9) DNoe | Lyrical | 07-17-2002 | closed |

Coming Soon Battles

| Emcees | Type | Posting Deadline | |
|---|---|---|---|
| 1. Osama Bin Laden (0) vs. (0) one_der | Lyrical | 07-18-2002 | coming soon |
| 2. FlyWeight (0) vs. (0) Philly-Blunt | Audio | 07-18-2002 | coming soon |
| 3. anSWr (0) vs. (0) Cajun | Lyrical | 07-18-2002 | coming soon |
| 4. Doc (0) vs. (0) YoungCuffs | Audio | 07-18-2002 | coming soon |
| 5. Rahmatic Cadmus (0) vs. (0) hardwhites | Lyrical | 07-18-2002 | coming soon |
| 6. lyrical_assassin (0) vs. (0) PHROXEN | Lyrical | 07-18-2002 | coming soon | view all coming soon battles

Figure 22

APPARATUS, METHOD AND SYSTEM FOR COMPARATIVE COLLABORATIVE CREATIVE WORKS EVALUATION

This application claims the benefit of U.S. Provisional Application No. 60/400,582 filed Aug. 2, 2002 which is herein incorporated by reference.

FIELD OF INVENTION

The present invention relates generally to an apparatus, method and system to evaluate creative work. More particularly, the disclosed invention relates to an apparatus, method and system to evaluate creative works through user collaboration and comparisons of a specified work.

BACKGROUND INFORMATION

Information Technology System

Typically, users, which may be people or other systems, engage information technology systems (e.g., commonly computers) to facilitate information processing. A computer operating system enables and facilitates users to access and operate computer information technology and resources. Common resources employed in information technology systems include input and output mechanisms through which data may pass, memory storage into which data may be saved, and processors by which information may be processed. Often information technology systems are used to collect data for later retrieval, analysis, and manipulation, which often is facilitated through database software. Information technology systems provide interfaces that allow users to access and operate various system components.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System or Microsoft's Windows provide a baseline and means of accessing and displaying information.

Networks

Networks are commonly thought to consist of the interconnection and interoperation of clients, servers, and intermediary nodes in a graph topology. It should be noted that the term "server" as used herein refers generally to a computer, other device, software, or combination thereof that processes and responds to the requests of remote users across a communications network. Servers serve their information to requesting "clients." A computer, other device, software, or combination thereof that facilitates, processes information and requests, and/or furthers the passage of information from a source user to a destination user is commonly referred to as a "node." Networks are generally thought to facilitate the transfer of information from source points to destinations. There are many forms of networks such as Local Area Networks (LANs), Wide Area Networks (WANs), Pico networks, etc.

Internet

As Internet usage increases, the amount of information available on the Internet also increases. The information that exists on the Internet is of many different types, including documents in many formats such as: computer software, databases, discussion lists, electronic journals, library catalogues, online information services, mailing lists, news groups, streaming media, and the like. Fortunately, much of the information on the Internet can be accessed through the World-Wide Web using a web browser to interact with the network in a user-friendly way.

Networks

Networks are commonly thought to consist of the interconnection and interoperation of clients, peers, servers, and intermediary nodes in a graph topology. It should be noted that the term "server" as used herein refers generally to a computer, other device, software, or combination thereof that processes and responds to the requests of remote users across a communications network. Servers serve their information to requesting "clients." A computer, other device, software, or combination thereof that facilitates, processes information and requests, and/or furthers the passage of information from a source user to a destination user is commonly referred to as a "node." Networks are generally thought to facilitate the transfer of information from source points to destinations.

Transmission Control Protocol-Internet Protocol (TCP/IP)

The proliferation and expansion of computer systems, databases, and networks of computers has been facilitated by an interconnection of such systems and networks in an extraterritorial communications network commonly referred to as the Internet. The Internet has developed and largely employs the Transmission Control Protocol-Internet Protocol (TCP/IP). TCP/IP was developed by a Department of Defense (DoD) research project to interconnect networks made by various and varying network vendors as a foundation for a network of networks, i.e., the Internet. The development of TCP/IP was in part driven by a requirement by the DoD to have a network that will continue to operate even if damaged during battle, thus allowing for information to be routed around damaged portions of the communications network to destination addresses. Of course, if the source or destination address location itself is rendered inoperable, such delivery will not be possible.

The Internet is a packet-switched network and thus, information on the Internet is broken up into pieces, called packets, and transmitted in packet form. The packets contain IP addressing information called headers, which are used by routers to facilitate the delivery of the packets from a source to a destination across intermediary nodes on the Internet. Upon arrival at the destination, the packets are reassembled to form the original message, and any missing packets are requested again.

The IP component of the protocol is responsible for routing packets of information based on a four byte addressing mechanism; the address is written as four numbers separated by dots, each number ranging from 0 to 255, e.g., "123.255.0.123". IP addresses are assigned by Internet authorities and registration agencies, and are unique.

The TCP portion of the protocol is used for verifying that packets of information are correctly received by the destination computer from the source, and if not, to retransmit corrupt packets. Other transmission control protocols are also commonly used that do not guarantee delivery, such as User Datagram Protocol (UDP).

World Wide Web

The proliferation and expansion of the Internet, and particularly the World Wide Web (the web), have resulted in a vast and diverse collection of information. Various user interfaces that facilitate the interaction of users with information technology systems (i.e., people using computers) are currently in use. An information navigation interface called WorldWideWeb.app (the web) was developed in late 1990. Subsequently, information navigation interfaces such as web browsers have become widely available on almost every computer operating system platform.

Generally, the web is the manifestation and result of a synergetic interoperation between user interfaces (e.g., web browsers), servers, distributed information, protocols, and specifications. Web browsers were designed to facilitate navigation and access to information, while information servers were designed to facilitate provision of information. Typically, web browsers and information servers are disposed in communication with one another through a communications network. Information Servers function to serve information to users that typically access the information by way of web browsers. As such, information servers typically provide information to users employing web browsers for navigating and accessing information on the web. Microsoft's Internet Explorer and Netscape Navigator are examples of web browsers. In addition, navigation user interface devices such as WebTV have also been implemented to facilitate web navigation. Microsoft's Information Server and Apache are examples of information servers.

SUMMARY OF THE INVENTION

An apparatus, method, and system for a comparative, collaborative, creative works evaluator (3CWE). One of the benefits of the 3CWE controller is that it provides a mechanism to rate and subsequently rank creative works and their authors. The benefits of ranking creative works and their authors are many, one of which is to provide audiences with guidance as to the quality and/or popularity of a given author or work. As such, the system provides and may act as a more accurate promotional vehicle in identifying and uncovering talent. This 3CWE system allows individuals without the standard resources (e.g., the monetary and promotional might of major record labels) to be recognized by an internationally-targeted market. By evaluating creative artists and works by interested participants, the artists and works' exposure is expanded.

In one, non-limiting example, present, inventive aspect of the disclosure provides a system that pits creative works, and as a consequence, their authors, against one another for evaluation by an audience. Evaluation is achieved by qualified audience members examining and/or experiencing the creative works that have been pitted against one another. Audience members may then render a vote as to which of the creative works are superior. The results of such an evaluation may then be recorded in the database and associated with a particular creative work, author, and/or the like. Such an evaluation may be viewed and referred to as a "battle." Through battles, accumulations of evaluative results in the system database for a particular creative work or author develops a ranking for the creative work and/or author. Also, groups of creative works and/or authors may be established as "divisions" and may themselves acquire rankings en masse. Furthermore, competitions amongst groups of authors may take place in the form of tournaments, which not only affect rankings, but may be limited to divisions and/or across specified ranges of users.

Thus, the system generally operates by affecting the rankings and status over time with regard to rankings (i.e., wins and losses) resulting from battles. These rankings are affected by changing values in the system's database updating a ranking point total. Ranking points may be computed and maintained in various forms. Rankings may be tallied for an author/creative work's life time, but rankings may be maintained for more discrete time periods (e.g., for a day, month, year, etc.).

The above advantages and features are of representative embodiments only, and are not exhaustive and/or exclusive. They are presented only to assist in understanding the invention. It should be understood that they are not representative of all the inventions defined by the claims, to be considered limitations on the invention as defined by the claims, or limitations on equivalents to the claims. For instance, some of these advantages may be mutually contradictory, in that they cannot be simultaneously present in a single embodiment. Similarly, some advantages are applicable to one aspect of the invention, and inapplicable to others. Furthermore, certain aspects of the claimed invention have not been discussed herein. However, no inference should be drawn regarding those discussed herein relative to those not discussed herein other than for purposes of space and reducing repetition. Thus, this summary of features and advantages should not be considered dispositive in determining equivalence. Additional features and advantages of the invention will become apparent in the following description, from the drawings, and from the claims.

BRIEF DESCRIPTION OF THE DRAWINGS

FIG. 10A is of a flow diagram illustrating one, non-limiting example, present, inventive aspect of the disclosure providing a tournaments facility;

FIGS. 10E-10H are of flow diagrams illustrating non-limiting example, present, inventive aspects of the disclosure providing greater detail to tournament paring of participants;

FIG. 13, which is of a web page screen interface illustrating one, non-limiting example, present, inventive aspect of the disclosure of a user's account with various battle status information;

FIG. 14 is of a web page screen interface illustrating one, non-limiting example, present, inventive aspect of the disclosure providing a creative work submission form facility;

FIG. 15 is of a web page screen interface illustrating one, non-limiting example, present, inventive aspect of the disclosure providing a notification and reply form facility;

FIG. 16 is of a web page screen interface illustrating one, non-limiting example, present, inventive aspect of the disclosure providing a "coming soon" facility listing pending battles;

FIG. 17 is of a web page screen interface illustrating one, non-limiting example, present, inventive aspect of the disclosure providing a closed battle status listing facility;

FIG. 18 is of a web page screen interface illustrating one, non-limiting example, present, inventive aspect of the disclosure providing a top 40 listing of competitors;

FIG. 19 is of a web page screen interface illustrating one, non-limiting example, present, inventive aspect of the disclosure provides a battle region selection facility;

FIG. 20 is of a web page screen interface illustrating one, non-limiting example, present, inventive aspect of the disclosure providing voting and commentary facility;

FIG. 21 is of a web page screen interface illustrating one, non-limiting example, present, inventive aspect of the disclosure providing a battle commentary listing facility;

FIG. 22 is of a web page screen interface illustrating one, non-limiting example, present, inventive aspect of the disclosure providing a battle status listing facility;

DETAILED DESCRIPTION OF THE INVENTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Comparative Collaborative Creative Works Evaluator Controller

Figure 1:
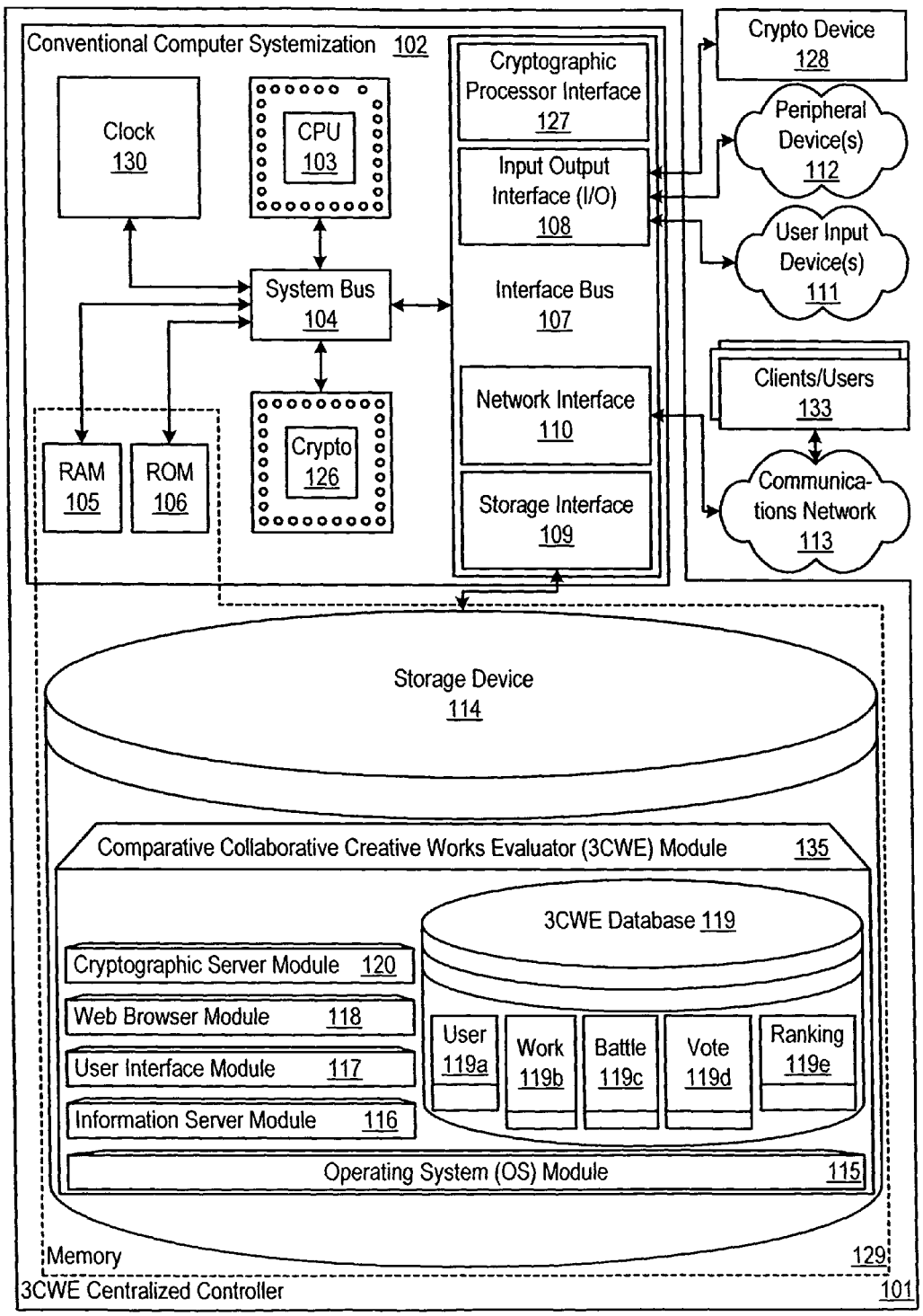
FIG. 1 is of a flow diagram illustrating one, non-limiting example, present, inventive aspect of the disclosure incorporated into a Comparative Collaborative Creative Works Evaluator (3CWE) controller.

FIG. 1 is of a flow diagram illustrating one, non-limiting example, present, inventive aspect of the disclosure incorporated into a Comparative Collaborative Creative Works Evaluator (3CWE) controller 101. In this embodiment, the 3CWE controller 101 may serve to evaluate, register, resolve, process, store, update, and validate the creative works of submitting users and any associated information, and/or the like.

In one embodiment, the 3CWE controller 101 may be connected to and/or communicate with entities such as, but not limited to: one or more users from user input devices 111; peripheral devices 112; and/or a communications network 113. The 3CWE controller may even be connected to and/or communicate with a cryptographic processor device 128.

A typical 3CWE controller 101 may be based on common computer systems that may comprise, but are not limited to, components such as: a computer systemization 102 connected to memory 129.

Computer Systemization

A computer systemization 102 may comprise a clock 130, central processing unit (CPU) 103, a read only memory (ROM), a random access memory (RAM), and/or an interface bus 107, and conventionally, although not necessarily, are all interconnected and/or communicating through a system bus 104. The system clock typically has a crystal oscillator and provides a base signal. The clock is typically coupled to the system bus and various means that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Optionally, a cryptographic processor 126 may similarly be connected to the system bus. Of course, any of the above components may be connected directly to one another, connected to the CPU, and/or organized in numerous variations employed as exemplified by various computer systems.

The CPU comprises at least one high-speed data processor adequate to execute program modules for executing user and/or system-generated requests. The CPU may be a microprocessor such as the Intel Pentium Processor and/or the like. The CPU interacts with memory through signal passing through conductive conduits to execute stored program code according to conventional data processing techniques. Such signal passing facilitates communication within the 3CWE controller and beyond through various interfaces.

Interface Adapters

Interface bus(ses) 107 may accept, connect, and/or communicate to a number of interface adapters, conventionally although not necessarily in the form of adapter cards, such as but not limited to: input output interfaces (I/O) 108, storage interfaces 109, network interfaces 110, and/or the like. Optionally, cryptographic processor interfaces 127 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), Personal Computer Memory Card International Association (PCMCIA), and/or the like.

Storage interfaces 109 may accept, communicate, and/or connect to a number of storage devices such as, but not limited to: storage devices 114, removable disc devices, and/or the like. Storage interfaces may employ connection protocols such as, but not limited to: (Ultra) Advanced Technology Attachment (Packet Interface) ((Ultra) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 110 may accept, communicate, and/or connect to a communications network 113. Through a communications network 113, the 3CWE controller is accessible through remote clients (e.g., computers with web browsers) by users 133. Network interfaces may employ connection protocols such as, but not limited to: direct connect, Ethernet (thick, thin, twisted pair 10/100/1000 Base T, and/or the like), Token Ring, wireless connection such as IEEE 802.11b, and/or the like. A communications network may be any one and/or the combination of the following: a direct interconnection; the Internet; a Local Area Network (LAN); Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface.

Input Output interfaces (I/O) 108 may accept, communicate, and/or connect to user input devices 111, peripheral devices 112, cryptographic processor devices 128, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394; infrared; joystick; keyboard; midi; optical; PC AT; PS/2; parallel; radio; serial; USB; video interface: BNC, composite, digital, RCA, S-Video, VGA, and/or the like; wireless; and/or the like. A common output device is a video display, which typically comprises a CRT or LCD based monitor with an interface (e.g., VGA circuitry and cable) that accepts signals from a video interface. The video interface composites information generated by a computer systemization and generates video signals based on the composited information. Typically, the video interface provides the composited video information through a video connection interface that accepts a video display interface (e.g., a VGA connector accepting a VGA display cable).

User input devices 111 may be card readers, dongles, finger print readers, gloves, graphics pads, joysticks, keyboards, mouse (mice), trackballs, trackpads, retina readers, and/or the like.

Peripheral devices 112 may be connected and/or communicate with or to I/O and/or with or to other facilities of the like such as network interfaces, storage interfaces, and/or the like). Peripheral devices may be cameras, dongles (for copy protection, ensuring secure transactions as a digital signature, and/or the like), external processors (for added functionality), goggles, microphones, monitors, network interfaces, printers, scanners, storage devices, visors, and/or the like.

Cryptographic units such as, but not limited to, microcontrollers, processors 126, interfaces 127, and/or devices 128 may be attached, and/or communicate with the 3CWE controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Other commercially available specialized cryptographic processors include VLSI Technology's 33 MHz 6868 or Semaphore Communications' 40 MHz Roadrunner 284.

Memory

A storage device 114 may be any conventional computer system storage. Storage devices may be a fixed hard disk drive, and/or other devices of the like. However, it is to be understood that a 3CWE controller and/or a computer systemization may employ various forms of memory 129. For example, a computer systemization may be configured wherein the functionality of on-chip CPU memory (e.g., registers), RAM, ROM, and any other storage devices are provided by a paper punch tape or paper punch card mechanism; of course such an embodiment is not preferred and would result in an extremely slow rate of operation. In a typical configuration, memory 129 will include ROM, RAM, and a storage device 114. Generally, any mechanization and/or embodiment allowing a processor to affect the storage and/or retrieval of information is regarded as memory 129. Thus, a computer systemization generally requires and makes use of memory. However, memory is a fungible technology and resource, thus, any number of memory embodiments may be employed in lieu of or in concert with one another.

Module Collection

The storage devices 114 may contain a collection of program and/or database modules and/or data such as, but not limited to: an operating system module 115 (operating system); an information server module 116 (information server); a user interface module 117 (user interface); a web browser module 118 (web browser); databases 119; a cryptographic server module 120 (cryptographic server); a comparative collaborative creative works evaluator (3CWE) module 135; and/or the like (i.e., collectively a module collection). These modules may be stored and accessed from the storage devices and/or from storage devices accessible through an interface bus. Although non-conventional software modules such as those in the module collection, typically and preferably, are stored in a local storage device 114, they may also be loaded and/or stored in memory such as: peripheral devices, RAM, remote storage facilities through a communications network, ROM, various forms of memory, and/or the like.

Operating System

The operating system module 115 is executable program code facilitating the operation of a 3CWE controller. Typically, the operating system facilitates access of I/O, network interfaces, peripheral devices, storage devices, and/or the like. The operating system preferably is a conventional product such as Apple Macintosh OS X Server, AT&T Plan 9, Microsoft Windows NT Server, Unix, and/or the like operating systems. Preferably, the operating system is highly fault tolerant, scalable, and secure. An operating system may communicate to and/or with other modules in a module collection, including itself, and/or facilities of the like. Conventionally, the operating system communicates with other program modules, user interfaces, and/or the like. For example, the operating system may contain, communicate, generate, obtain, and/or provide program module, system, user, and/or data communications, requests, and/or responses. The operating system, once executed by the CPU, may enable the interaction with communications networks, data, I/O, peripheral devices, program modules, memory, user input devices, and/or the like. Preferably, the operating system provides communications protocols that allow the 3CWE controller to communicate with other entities through a communications network 113. Various communication protocols may be used by the 3CWE controller as a subcarrier transport mechanism for interacting with various communications networks, such as, but not limited to: multicast, TCP/IP, UDP, unicast, and/or the like.

Information Server

An information server module 116 is stored program code that is executed by the CPU. The information server may be a conventional Internet information server such as, but not limited to, Microsoft's Internet Information Server and/or the Apache Software Foundation's Apache. Preferably, the information server allows for the execution of program modules through facilities such as ActiveX, Active Server Page (ASP), Common Gateway Interface (CGI) scripts, C++, Java, JavaScript, Perl, Python, and/or the like. The execution of program modules, database adaptors, and/or the like facilitates data exchange with the 3CWE's database. Preferably the information server supports secure communications protocols such as, but not limited to, File Transfer Protocol (FTP); HyperText Transfer Protocol (HTTP); Secure Hypertext Transfer Protocol (HTTPS), Secure Socket Layer (SSL), and/or the like. Conventionally, an information server provides results in the form of web pages to web browsers, and allows for the manipulated generation of the web pages through interaction with other program modules. After a DNS resolution portion of an HTTP request is resolved to a particular information server, the information server resolves requests for information at specified locations on a 3CWE controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Furthermore, certain locations and/or web pages at the 3CWE may trigger program modules that interface with other 3CWE systems such as the 3CWE database 119; for example http://123.124.125.126/registration.cgi?new might cause the contents of a registration web form to be passed to the 3CWE database through a CGI script module. An information server may communicate to and/or with other modules in a module collection, including itself, and/or facilities of the like. Most frequently, the information server communicates with operating systems, other program modules, user interfaces, web browsers, and/or the like. An information server may contain, communicate, generate, obtain, and/or provide program module, system, user, and/or data communications, requests, and/or responses.

User Interface

A user interface module 117 is stored program code that is executed by the CPU. Preferably, the user interface is a conventional graphic user interface as provided by, with, and/or atop operating systems and/or operating environments such as Apple Macintosh OS, e.g., Aqua, Microsoft Windows (NT), Unix X Windows (KDE, Gnome, and/or the like), and/or the like. The user interface may allow for the display, execution, interaction, manipulation, and/or operation of program modules and/or system facilities through textual and/or graphical facilities. Furthermore, a user interface may be provided to users by way of web pages that allow remote users to interact with the 3CWE controller, wherein the 3CWE controller itself serves users such web pages through its information server upon request. The user interface provides a facility through which users may affect, interact, and/or operate a computer system. A user interface may communicate to and/or with other modules in a module collection, including itself, and/or facilities of the like. Most frequently, the user interface communicates with operating systems, other program modules, and/or the like. The user interface may contain, communicate, generate, obtain, and/or provide program module, system, user, and/or data communications, requests, and/or responses.

Web Browser

A web browser module 118 is stored program code that is executed by the CPU.

Preferably, the web browser is a conventional hypertext viewing application such as Microsoft Internet Explorer or Netscape Navigator (preferably with 128-bit (or greater) encryption by way of HTTPS, SSL, and/or the like). Some web browsers allow for the execution of program modules through facilities such as Java, JavaScript, ActiveX, and/or the like. Web browsers and like information access tools may be integrated into PDAs, cellular telephones, and/or other mobile devices. A web browser may communicate to and/or with other modules in a module collection, including itself, and/or facilities of the like. Most frequently, the web browser communicates with information servers, operating systems, integrated program modules (e.g., plug-ins), and/or the like; e.g., it may contain, communicate, generate, obtain, and/or provide program module, system, user, and/or data communications, requests, and/or responses. Of course, in place of a web browser and information server, a combined application may be developed to perform similar functions of both. The combined application would similarly affect the obtaining and the provision of information to users, user agents, and/or the like from 3CWE enabled nodes. The combined application may be nugatory on systems employing standard web browsers. Such a combined module could be configured to communicate directly with the 3CWE without an intermediary information server to further enhance security.

3CWE Database

A 3CWE database module 119 may be embodied in a database that is stored program code that is executed by the CPU and its stored data; the stored program code portion configuring the CPU to process the stored data. Preferably, the database is a conventional, fault tolerant, relational, scalable, secure database such as MySQL, Oracle. Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship. As such, any information from the 3CWE database may be accessed by an information server through the use of adapters and/or conduits. For example, in one example embodiment, CGI scripts parse HTML values, which were supplied by users to an information server via web form pages. The CGI scripts may themselves (and/or through the use of database adaptors) provide the parsed values as a basis for supplying the 3CWE database with SQL queries. Upon providing the database with queries from the information server, thereafter, the CGI scripts may engage in the complement activity and parse SQL query results from the 3CWE database; such results may be reformatted into HTML and the resulting HTML may be provided to the information server, which in turn may present it to remote users.

Alternatively, the 3CWE database may be implemented using various standard data-structures, such as an array, hash, (linked) list, struct, table, and/or the like. Such data-structures may be stored in memory and/or in (structured) files. If the 3CWE database is implemented as a data-structure, the use of the 3CWE database may be integrated into another module such as the 3CWE module itself. Databases may be consolidated and/or distributed in countless variations through standard data processing techniques. Portions of databases, e.g., tables, may be exported and/or imported and thus decentralized and/or integrated.

In one non-limiting example embodiment, the database module 119 includes tables such as but not limited to a: User table 119a, which acts as a repository to store information, evaluation and ranking information for a specific user; Creative Works table 119b, which acts as a repository to store works that will be evaluated on the system; Battle table 119c, which acts as a repository to store information regarding a comparison of works, users, and/or the like; Ranking table 119d, which acts as a repository to store information rankings with regard to battles, divisions, users, regions, and/or the like; Vote table 119d, which acts as a repository to store information about votes with regard to battles, divisions, users, regions, and/or the like; and Division table, which acts as a repository to store information rankings with regard to battles, divisions, users, race, regions, sex, and/or the like; and/or the like. The tables further include fields to store more specific information, all of which may be used as criteria for filtering and/or qualifying information, e.g., through SQL queries and comparisons, in the operation of the 3CWE. A non-limiting example embodiment of table fields may include: User table (e.g., providing fields for a user's name (which may be unique and key), contact information, division memberships, geographic location, race, rankings, sex, votes received count, votes cast count, and/or the like) 119a; Creative Works table (e.g., providing fields for a creative work identifier (which may be unique and key), author (i.e., the user's name), battles, creative works data (i.e., which may be text (e.g., lyrics), graphics (e.g., a still image), audio, video, multimedia, and/or the like data formats), date of submission, description of the creative work, ratings, and/or the like) 119b; Battle table (e.g., providing fields for a battle identifier (which may be unique and key), battle start date, battle end date, battle participants (i.e., user's names engaged in a battle), battle ranking weight, battle division, battle voter qualifiers, creative work identifiers, votes, and/or the like) 119c; Ranking table (e.g., providing fields for a ranking identifier (which may be unique and key), ranking division, ranking weight, and/or the like) 119d, Vote table (e.g., providing fields for a vote identifier (which may be unique and key), battle identifier, creative work identifier, user's name, voting qualifications, vote start date, vote end date, vote totals, and/or the like) 119e; a Division table, which is not pictured (e.g., providing fields for a division identifier (which may be unique and key), battle identifier (i.e., division battles), division name, geographic location, user's name (i.e., division members), and/or the like); and/or the like. All the tables may be related by their unique key field entries and recombined employing standard. In an alternative embodiment, these tables have been decentralized into their own databases and their respective database controllers (i.e., individual database controllers for each of the above tables). Of course, employing standard data processing techniques, one may further distribute the databases over several computer systemizations and/or storage devices. Similarly, configurations of the decentralized database controllers may be varied by consolidating and/or distributing the various database modules 119a-e. The 3CWE may be configured to keep track of user requests and various transactions tracking via database controllers.

A 3CWE database may communicate to and/or with other modules in a module collection, including itself, and/or facilities of the like. Most frequently, the 3CWE database communicates with a 3CWE module, other program modules, and/or the like. The database may contain, retain, and provide information regarding other nodes and data.

Cryptographic Server

A cryptographic server module 120 is stored program code that is executed by the CPU 103, cryptographic processor 126, cryptographic processor interface 127, cryptographic processor device 128, and/or the like. Preferably, cryptographic processor interfaces will allow for expedition of encryption and/or decryption requests by the cryptographic module; however, the cryptographic module, alternatively, may run on a conventional CPU. Preferably, the cryptographic module allows for the encryption and/or decryption of provided data. Preferably, the cryptographic module allows for both symmetric and asymmetric (e.g., Pretty Good Protection (PGP)) encryption and/or decryption. Preferably, the cryptographic module allows conventional cryptographic techniques such as, but not limited to: digital certificates (e.g., X.509 authentication framework), digital signatures, dual signatures, enveloping, password access protection, public key management, and/or the like. Preferably, the cryptographic module will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, RC5 (Rivest Cipher), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. The cryptographic module facilitates the process of "security authorization" whereby access to a resource is inhibited by a security protocol wherein the cryptographic module effects authorized access to the secured resource. A cryptographic module may communicate to and/or with other modules in a module collection, including itself, and/or facilities of the like. Preferably, the cryptographic module supports encryption schemes allowing for the secure transmission of information across a communications network to enable a 3CWE module to engage in secure transactions if so desired by users. The cryptographic module facilitates the secure accessing of resources on 3CWE and facilitates the access of secured resources on remote systems; i.e., it may act as a client and/or server of secured resources. Most frequently, the cryptographic module communicates with information servers, operating systems, other program modules, and/or the like. The cryptographic module may contain, communicate, generate, obtain, and/or provide program module, system, user, and/or data communications, requests, and/or responses.

Comparative Collaborative Creative Works Evaluator (3CWE)

An 3CWE module 135 is stored program code that is executed by the CPU. Generally, the 3CWE affects accessing, obtaining and the provision of information, and/or the like between nodes on a communications network. Generally, the IAMRS acts as a lookup facility to create, maintain, and update associations between a given creative work and its author, on-going and past evaluations (i.e., battles) of authors and works, rankings, and/or the like. The 3CWE coordinates with the 3CWE database to create queries regarding the evaluation information and ease retrieval of relevant and dynamic information, and in turn providing retrieved information to the information server. A 3CWE enabling access of information may be developed by employing standard development tools such as, but not limited to: C++, shell scripts, Java, Javascript, SQL commands, web application server extensions, Apache modules, Perl scripts, binary executables, and/or other mapping tools, and/or the like. In one non-limiting example embodiment, the 3CWE server employs a cryptographic server to encrypt and decrypt communications. The 3CWE may catalog content (i.e., author information, battles, creative works, etc.), service requests, update user and creative work information, and much more. A 3CWE module may communicate to and/or with other modules in a module collection, including itself, and/or facilities of the like. Most frequently, the 3CWE module communicates with a 3CWE database, operating systems, other program modules, and/or the like. The 3CWE may contain, communicate, generate, obtain, and/or provide program module, system, user, and/or data communications, requests, and/or responses.

Distributed 3CWE

The functionality of any of the 3CWE node controller components and/or functionalities may be combined, consolidated, and/or distributed in any number of ways to facilitate development and/or deployment. Similarly, the module collection may be combined in any number of ways to facilitate deployment and/or development. To accomplish this, one must simply integrate the components into a common code base or in a facility that can dynamically load the components on demand in an integrated fashion.

The module collection may be consolidated and/or distributed in countless variations through standard data processing and/or development techniques. Multiple instances of any one of the program modules in the program module collection may be instantiated on a single node, and/or across numerous nodes to improve performance through load balancing data processing techniques. Furthermore, single instances may also be distributed across multiple controllers and/or storage devices; e.g., databases.

All program module instances and controllers working in concert may do so through standard data processing communication techniques.

The preferred 3CWE controller configuration will depend on the context of system deployment. Factors such as, but not limited to, the capacity and/or location of the underlying hardware resources may affect deployment requirements and configuration. Regardless of if the configuration results in more consolidated and/or integrated program modules, results in a more distributed series of program modules, and/or results in some combination between a consolidated and/or distributed configuration, communication of data may be communicated, obtained, and/or provided. Instances of modules (from the module collection) consolidated into a common code base from the program module collection may communicate, obtain, and/or provide data. This may be accomplished through standard data processing techniques such as, but not limited to: data referencing (e.g., pointers), internal messaging, object instance variable communication, shared memory space, variable passing, and/or the like (intra-application communication).

If module collection components are discrete, separate, and/or external to one another, then communicating, obtaining, and/or providing data with and/or to other module components may be accomplished through standard data processing techniques such as, but not limited to: Application Program Interfaces (API) information passage; (distributed) Component Object Model ((D)COM), (Distributed) Object Linking And Embedding ((D)OLE), and/or the like), Common Object Request Broker Architecture (CORBA), process pipes, shared files, and/or the like (inter-application communication). Messages sent between discrete module components for inter-application communication or within memory spaces of a singular module for intra-application communication may be facilitated through the creation and parsing of a grammar. A grammar may be developed by using standard development tools such as lex, yacc, and/or the like, which allow for grammar generation and parsing functionality, which in turn may form the basis of communication messages within and between modules. Again, the preferable embodiment will depend upon the context of system deployment.

Finally, it is to be understood that the logical and/or topological structure of any combination of the module collection and/or the present invention as described in the figures and throughout are not limited to a fixed execution order and/or arrangement, but rather, any disclosed order is exemplary and all functional equivalents, regardless of order, are contemplated by the disclosure. Furthermore, it is to be understood that such structures are not limited to serial execution, but rather, any number of threads, processes, services, servers, and/or the like that may execute asynchronously, simultaneously, synchronously, and/or the like are contemplated by the disclosure.

Comparative Collaborative Creative Works Evaluator Overview

In order to facilitate understanding of various inventive aspects present in the disclosure, a description of selected entities and relationships and concepts are described.

One of the benefits of the 3CWE controller (hereinafter "3CWE" or "system") is that it provides a mechanism to rate and subsequently rank creative works and their authors. The benefits of ranking creative works and their authors are many, one of which is to provide audiences with guidance as to the quality and/or popularity of a given author or work. As such, the system provides and may act as a more accurate promotional vehicle in identifying and uncovering talent.

This 3CWE system allows individuals without the standard resources (e.g., the monetary and promotional might of major record labels) to be recognized by an internationally-targeted market. By evaluating creative artists and works by interested participants, the artists and works' exposure is expanded. This allows world-wide audiences to discern higher quality artists and works without undue research, and provides a vehicle to artists and art lovers alike for a more efficient, less subjective and egalitarian manner of promotion by eliminating the encumbrances of initial contact of record labels, managers, agents, club owners, or any other related industry middle manager. The ranking system measures actual popularity and reputation measurements by people interested in a particular genera, geographical region, etc. without employing costly promotional vehicles or relying on the subjective opinions of record label executives.

With that in mind, it should be noted that a creative work may take on many forms, and the system's only limitation are in its ability to store appropriate formats within its 3CWE database (hereinafter "3CWE database" or "database"). Creative works may be any works by any entity. Common works may include, but are not limited to: text, which may take the form of debates, lyrics, poetry, literature, argument, and/or the like; graphics, which may take the form of photographs (i.e., still images), illustrations, paintings, and/or the like; audio, which may take the form of debates, lyrics, poetry, literature, argument, music, sound effect, and/or the like; video, which may take the form of movies, short films, animations, art, debate, argument, poetry, and/or the like; multimedia, which may take the form of interactive mediums such as programs, web pages, and/or the like; and/or the like.

It is also important to note that there are creative entities that cause such creative works to come into existence. These creative entities may be authoring human beings, programs generating output (e.g., a 3D mathematical program offering aesthetically pleasing analysis of various physical phenomena), and/or the like. Such creative entities (hereinafter "authors") themselves may be evaluated and ranked, offering similar promotional benefits for audiences.

To this end, the system pits creative works, and as a consequence, their authors against one another for evaluation by an audience. Evaluation is achieved by qualified audience members examining creative works that have been pitted against one another and then having the audience members render a vote as to which of the creative works are superior. The results of such an evaluation may then be recorded in the database and associated with a particular creative work, author, and/or the like. Such an evaluation may be viewed and referred to as a "battle." Battle participants are typically authors who supply creative works for evaluation (hereinafter "battlers," "users," "participants," or "authors"). Audience members who render votes on battles are normally human beings (hereinafter "spectators," "users," or "voters"). Accumulations of evaluative results in the system database for a particular creative work or author develops a ranking for the creative work and/or author. Also, groups of creative works and/or authors may be established as "divisions" and may themselves acquire rankings en masse. Furthermore, competitions amongst groups of authors may take place in the form of tournaments, which not only affect rankings, but may be limited to divisions and/or across specified ranges of users.

Thus, the system generally operates by affecting the rankings and status over time with regard to rankings (i.e., wins and losses) resulting from battles. These rankings are affected by changing values in the system's database updating a ranking point total. Ranking points may be computed and maintained in various forms. For example, rankings may be tallied for an author/creative work's life time, but rankings may be maintained for more discrete time periods (e.g., for a day, month, year, etc.).

Battles

Battles and competitions may be formed on the basis of any criteria maintained in the system's database. For example, because database record fields store user's names, rankings, ages, etc., a tournament may be established by selecting participants from the system's database on such a peculiar basis (e.g., an SQL select of user's named "Joe" who are over 30 years old, with a novice ranking). For example, battles may be limited in duration, number of revisions, stages (i.e., rejoinders), the size, length, and/or type of creative works can vary from competition to competition. Thus, in one example competition, a battle may be established to allow competitors only 1 hour to provide a creative audio work that may not be longer than 5 seconds in duration or 500 KB in size for specified battlers.

As such, various criteria may be mentioned throughout the disclosure as a basis for creating, searching and/or updating information, and it is to be understood that requisite database tables, fields, records, etc. exist upon which such activities may be performed.

Offer to Compete

An offer to compete may be sent in at least two ways:

1. A private or public message/notification in a web page through the system. (see FIG. 3)

2. An email message/notification.

The sender of the offer to compete has the option to fill out the offer specifics such as, but not limited to: type and length of creative work, voting and submission deadlines, and offer message. The recipient of the offer to compete has the option to decline or accept the offer (see FIG. 3). The system may also randomly pair up participants from a predetermined pool. If the offer is accepted, a competition between the sender and recipient of the offer is automatically created and listed in the system. This centralized listing includes all the competitions that have recently closed, that are currently available for voting, and that will be made available in the future; including all related information of the competitions such as, but not limited to, the competition participants, type, length, division, and deadlines.

Submitting a Creative Work for a Battle

Once participants of the competition have an agreed to battle, which occurs upon acceptance of an offer to compete, i.e., agreeing upon a number of days in which to submit their creative with which they will be competing, then a battle will commence and the participants are now battlers. When a competition gets set up, it will then be listed under each of the competing participant's account; see FIG. 3. Each participant will be able to submit, edit and save his or her piece of work. They may edit their saved piece of work as many times as they wish during this time.

Voting on the Competitions

In one non-limiting embodiment, voting may commence only when battlers have submitted a complete creative work matching the criteria of battling requirements. In an alternative embodiment, voters may vote on creative works in various stages of progress as well, and through voting and commentary mechanisms, collaborate in the development of the final creative work. However, in a more common battle scenario, when the set number of days for each battler to submit their creative has passed, they will no longer be allowed to edit their work. The battle is then made public and the system automatically takes the creative work that each battler has saved from the database and presents it to the other users of the system, who then, if qualified, are allowed to individually vote for a winner. Each competition is available for voting for a predetermined number of days or until a battler gets a predetermined number of votes, which depends on the "offer to compete," i.e., the terms of the battle. The voters have the option to explain why they are voting for a particular participant and provide commentary. The system automatically tallies up the votes after each one is cast. At the end of the voting period, the system will automatically close the competition, determine a winner based on the total votes and update all related data such as rating, rank, and competition record. It is important to note that the system offers "combatants" the option to "battle" to the public in a double-blind manner where the combatants are not able to see each other's work so neither has an advantage. In an alternative embodiment, battlers may provide their work an allow their adversary to see the work before the adversary provides their own competing creative work.

Ratings/Rankings

Rankings are accumulations of ratings for any given battle. Participants of the system will get rated and ranked among each other based on the win/loss/tie results of all their qualifying competitions. Each participant may be geographically ranked (e.g., Internationally, Nationally, State, Region, etc.). Furthermore, participants may be ranked by various division criteria as has already been discussed. Each division has their own set of privileges and restrictions. Thus, depending on their rating/rank, participants may automatically be placed in certain divisions as they achieve results warranting such entry. It should be noted that tournaments are comprised of a number of battles, and as such, the fundamental rating and ranking principles apply to tournaments as well.

As such, rating computations may be as simple and/or as complicated as desired. In one alternative embodiment, battlers may risk all of their ratings points in a winner-takes-all competition. In more simple rating systems, battlers may receive a single rating point for a victory, or have a single rating point removed for a loss in a battle. In another alternative embodiment, rating points may be weighted by the total number of viewers or voters examining the creative work. In yet another alternative embodiment, system users and/or administrators may themselves deem and/or provide formulas for rankings in general, within a specific division, for a particular battle or tournament, and/or the like.

In yet another alternative embodiment, a rating formula is provided as such:

$$Rn = Ro + K(W - (1/(1 + 10^{(d/s)})))$$

Where the various variables have the following meanings:
$Rn$ = New Rating
$Ro$ = Old Rating
$K$ = Weight (e.g., 60 ratings point may be given if the battler's current rating <2000, while only 20 rating points are given if the battler's rating >2400, and ((2400 rating points−Ro)/10)+20 rating points may be given if the battler's rating is between 2000 and 2400; i.e., the weight is changeable)
$W$ = Battle Result (a factor of 0 for loss, a factor of 1 for win, and a factor 0.5 for tie)
$d$ = Rating Difference (the absolute difference of the two battler's ratings)
$s$ = Spread (400, spread is changeable)

Furthermore, Rn can be adjusted by any number of modifiers, for example, if any of the following conditions are met:

Additional K weight may be awarded if the battle being rated is an audio battle.

Additional K weight may be awarded if any of the battlers have participated in a significant number of battles.

Additional K weight may be awarded if the lower rated battler wins by significant number of votes.

Additional K weight may be awarded if greater than a specified number of votes are recorded, wherein the weight awarded is a function of the actual number of viewers, voters, and/or votes.

A ratings formula such as provided immediately above (i.e., "$Rn = Ro + K(W - (1/(1 + 10^{(d/s)})))$") has the advantage of rewarding novice battlers that dare battle with more experienced battlers, while not rewarding more experienced battlers that defeat novices (i.e., bullying is not rewarded, while heroism is more greatly rewarded). Such a rating has the advantage of highlighting new talent while forcing experienced battlers to maintain a high standard by continuing to battle with higher quality adversaries.

Thus, upon the conclusion of a given battle, any such ratings formula may be employed by reading in the requisite values from the system's database, computing the new ratings value, storing back the new rating, and subsequently employing the new rating for future evaluation.

Divisions

Divisions may be constructed on the basis of numerous criteria. For example, a division may be made be established for females who are over 30 years old, with an expert ranking. In an alternative embodiment, system users are allowed to establish their own divisions, wherein they establish criteria for entry and rankings. In an alternative embodiment, generalized division placement may be determined by rating percentiles as follows:

Elite Division: wherein a particular battler's and/or work's rating score is in the 96%-100% range of rating scores.

Division 1: wherein a particular battler's and/or work's rating score is in the 80%-95% range of rating scores.

Division 2: wherein a particular battler's and/or work's rating score is in the 60%-79% range of rating scores.

Division 3: wherein a particular battler's and/or work's rating score is in the 0%-59% range of rating scores.

Newbies Division: wherein any battler who has not met the minimum number of battles to yet be rated.

Participants

Each participant of the system has their own system account along with a private and public profile with information such as, but not limited to:

Activity: A list of "offers to compete" that are being made and received, a list of open competitions, private messages;

Biography: Picture, name, group, location, website, contact information, personal messages, division, rank, rating, record, battle style preference;

List of Creative Works: A complete collection of their creative works, all their battles, all of the corresponding votes, and the final results.

Each participant is allowed to edit certain data in their profiles, such as biographical information. Also, participants are allowed in some cases to edit and provide new creative works. Participants, however are not capable of directly editing their division, ranking, ratings, record, etc. other than by way of battle competition so as to ensure fair and accurate standings.

Battling Overview

Figure 2:
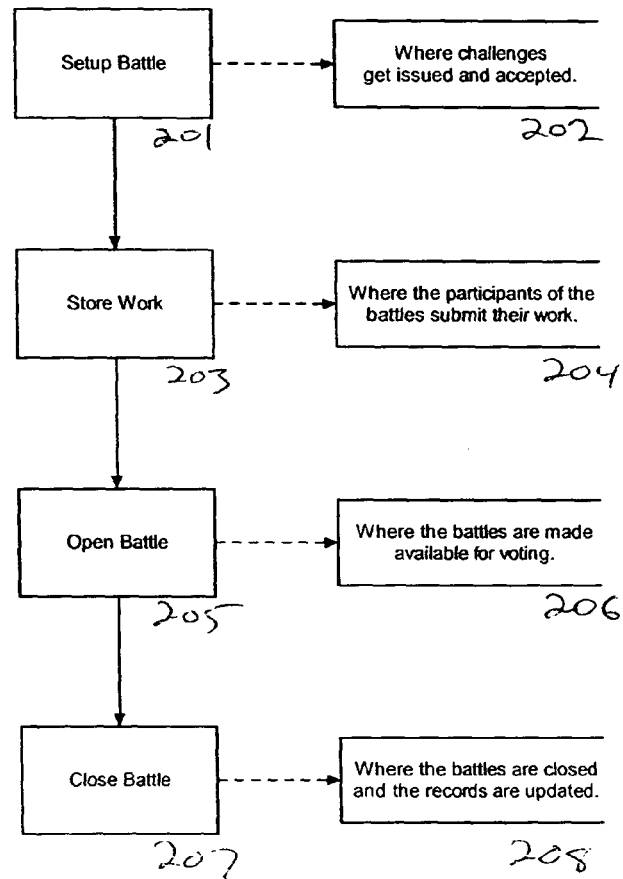
FIG. 2 is of a flow diagram illustrating one, non-limiting example, present, inventive aspect of the disclosure providing an overview of battling.

FIG. 2 is of a flow diagram illustrating one, non-limiting example, present, inventive aspect of the disclosure providing an overview of battling. Users employing the system may engage in battles to determine the relative strengths of creative works. As such, the system provides the ability to set up a battle 201. The battle set-up facility 201 allows users to issue and accept challenges 202. The system also provides a facility to store their creative works 203, which allows participants to submit their work and maintain it on the system 204. Upon finalizing a creative work, users may open and engage in a battle 205 in an area on the system that makes creative works accessible for evaluation 206. This may be achieved by simply querying the database for a list of all open battles and providing the results to an information server for incorporation into a web page. The evaluations may take on many forms and, generally, allow for spectators to experience the creative work and vote for which creative work they believe is superior 206. Also, the system closes battles 207 and upon closing a battle then records information regarding the creative work, such as, the popularity and/or votes obtained from spectators for a creative work and the general results of a comparative evaluation by spectators of a winning work and its author; similarly the results for the competing author and creative work are also updated and recorded on the system 208.

Figure 3:
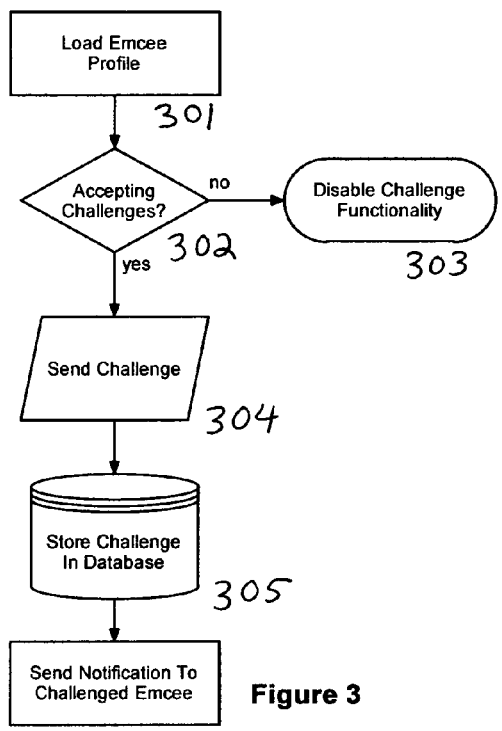
FIG. 3 is of a flow diagram illustrating one, non-limiting example, present, inventive aspect of the disclosure of setting up a battle.
Figure 12:
FIG. 12 is an exemplary implementation of a user challenge input form.

FIG. 3 is of a flow diagram illustrating one, non-limiting example, present, inventive aspect of the disclosure of setting up a battle. Initially, a challenge may be issued by one user of the system; see FIG. 12, which is of a web page screen interface illustrating one, non-limiting example, present, inventive aspect of the disclosure providing an "offer to compete" facility. As has already been discussed above, "offers to compete," i.e., challenges, are issued by a user (e.g., an emcee) after the user loads their profile 301. In one example embodiment, a user may access their profile by providing a unique identifier, e.g., their user name, and a password. Upon loading the user's profile, the user is presented with challenges (see FIG. 13, which is of a web page screen interface illustrating one, non-limiting example, present, inventive aspect of the disclosure of a user's account with various battle status information) from others and the user may accept or decline any such challenges (see FIG. 14, which is of a web page screen interface illustrating one, non-limiting example, present, inventive aspect of the disclosure providing a creative work submission form facility (the example embodiment is for a battle requiring textual lyrics, however, a submission of any type of creative work may be obtained through a similar mechanism)) 302. If the user declines a challenge, the challenge facility is disabled for the user and/or battle 303. However, if a user accepts the challenge 302, the challenge is sent 304 to the system's database and stored 305. Once the challenge is stored in the systems database 305, the system may issue a notification to the user who is being challenged (see FIG. 15, which is of a web page screen interface illustrating one, non-limiting example, present, inventive aspect of the disclosure providing a notification and reply form facility) 306.

Figure 4:
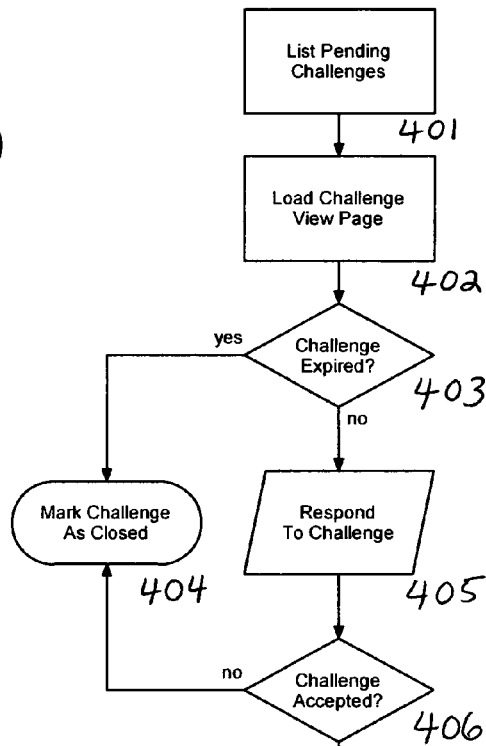
FIG. 4 is of a flow diagram illustrating one, non-limiting example, present, inventive aspect of the disclosure providing a facility allowing for a user to reply to an issued challenge.

FIG. 4 is of a flow diagram illustrating one, non-limiting example, present, inventive aspect of the disclosure providing a facility allowing for a user to reply to an issued challenge. Initially, a system lists pending challenges for a given user (see FIG. 13) 401. When the user loads a challenge view page 402, a determination is made regarding if the challenge is expired or not 403. If the challenge has expired 403, the challenge is marked as closed 404. However, if the challenge is not expired 403, a user may respond to the challenge 405. Upon responding to the challenge 405, if the challenge is declined by the party issuing the challenge 406, the challenge is marked as closed 404. Otherwise, if the challenge is accepted by the challenged user 406, the challenge is stored in a battle database 407. Thereafter, the battle will be listed as a "coming soon" attraction and/or battle so that spectators may follow and vote in a competition (see FIG. 16, which is of a web page screen interface illustrating one, non-limiting example, present, inventive aspect of the disclosure providing a "coming soon" facility listing pending battles) 408.

Figure 5:
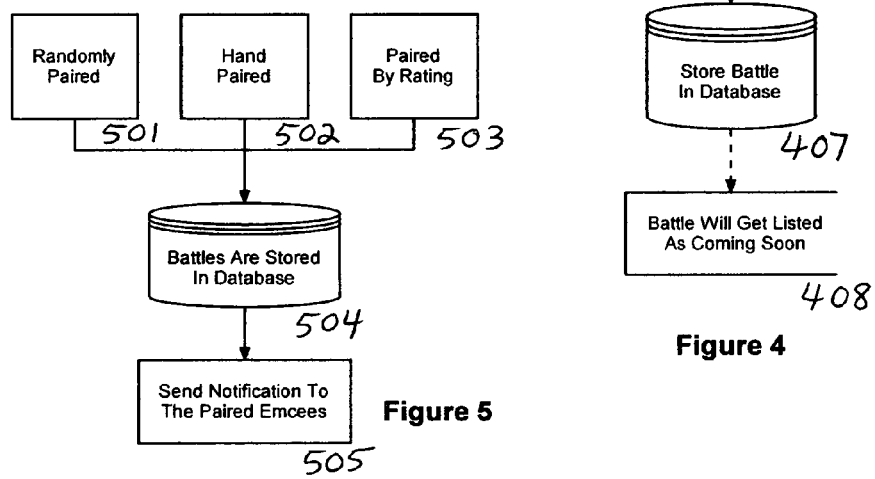
FIG. 5 is of a flow diagram illustrating one, non-limiting example, present, inventive aspect of the disclosure of variations of setting-up battles.

FIG. 5 is of a flow diagram illustrating one, non-limiting example, present, inventive aspect of the disclosure of variations of setting-up battles. Depending upon the circumstances leading up to a battle, battles may comprise pairs of users chosen at random 501, hand-selected users 502, or users selected based on their rankings 503. The various battles are stored in a database 504 and notifications are sent to the paired users 505.

Figure 6:
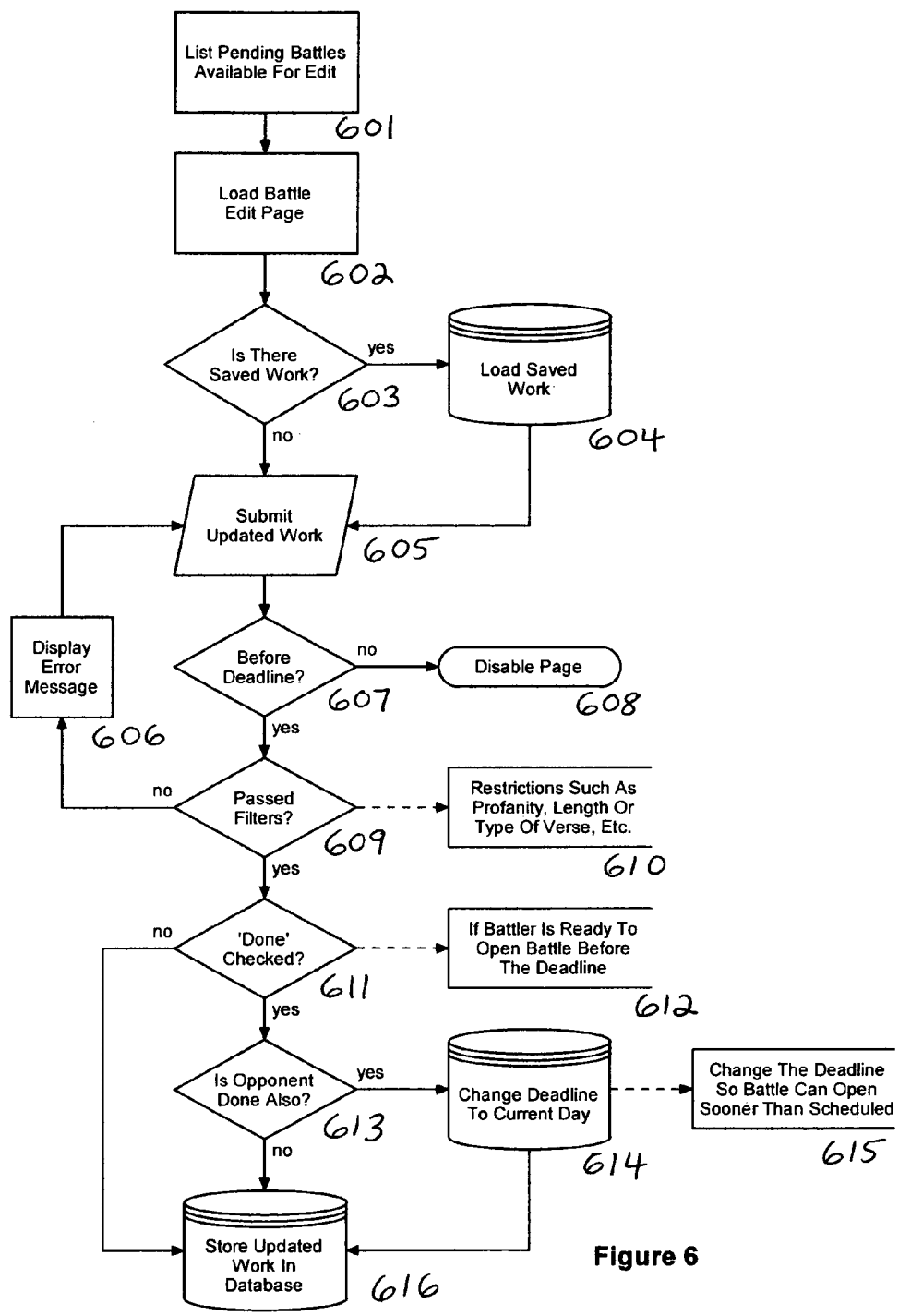
FIG. 6 is of a flow diagram illustrating one, non-limiting example, present, inventive aspect of the disclosure providing a facility to store battles.

FIG. 6 is of a flow diagram illustrating one, non-limiting example, present, inventive aspect of the disclosure providing a facility to store battles. Initially, a list of pending battles that are available for editing is provided 601 (see FIG. 13 for an example). A user may load a battle in an editing page 602 (see FIG. 14 for an example). The system determines if there is a creative work already saved on the system 603 by performing a lookup in the database. If there already is a creative work saved on the system 603, then that work may be loaded from the database 604. If no work is saved 603, or if the work is loaded 604, then a creative work that has been updated or provided may, be submitted by the user 605. Upon obtaining a submitted work 605, the system determines if the creative work was submitted before a deadline that is established for the battle 607. If the work was not submitted before the deadline 607, then the editing page for the battle is disabled 608. If the deadline has not passed 607, optionally, the work may be screened with filters 609. If the work is screened with filters and the work does not pass the filters, an error page may be displayed 606 at which time the user may once again attempt to submit his or her creative work 605. Filters may include restrictions on profanity, length, type of verse, type of medium, etc. 610 and may be achieved through parsing for restricted tokens on the system. If the creative work passes the screening filter 609, the system will then determine if the user checked or otherwise indicated they were satisfied with the submission of their creative work, i.e., that they were done 611. In other words, the system will determine if the user is ready to open a battle before the deadline 612. If the user does not indicate they are done with storing their creative work, then their updated work is stored in a database 616. If the user does indicate they are done 611, the system will determine if the opponent is also done with the submission of their creative work 613. If the opponent is not done with their creative work, their updated work is stored in a database 616. If the opponent is also done 613, then the deadline for the battle to begin is changed to the current day 614. In such an embodiment, battles may proceed before their deadline 615. However, in alternative embodiments, battles may be designated not to commence until the actual deadline.

Figure 7:
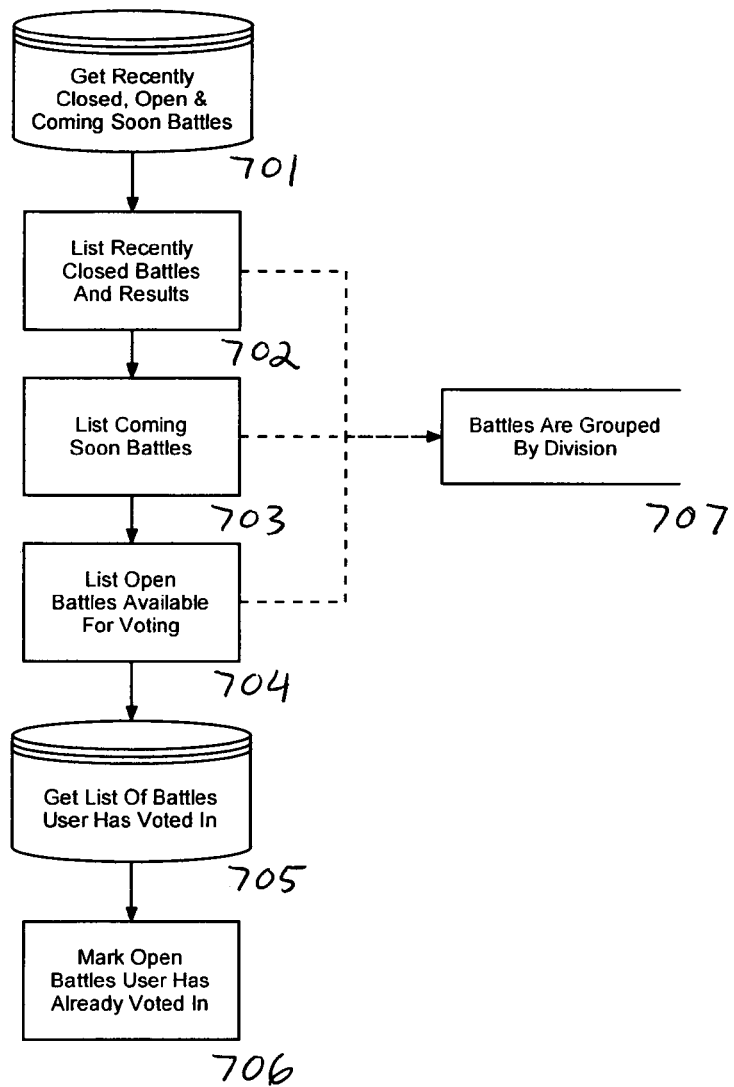
FIG. 7 is of a flow diagram illustrating one, non-limiting example, present, inventive aspect of the disclosure providing a facility to open a battle.

FIG. 7 is of a flow diagram illustrating one, non-limiting example, present, inventive aspect of the disclosure providing a facility to open a battle. Initially, the system obtains recently closed, open and coming soon battles 701 from a database. This may be achieved by querying for battles based on battle status, date, etc. The system may then list recently closed battles and the results from those battles (see FIG. 17, which is of a web page screen interface illustrating one, non-limiting example, present, inventive aspect of the disclosure providing a closed battle status listing facility) 702. It may then provide a display list of battles that are coming soon (see FIG. 16, which is of a web page screen interface illustrating one, non-limiting example, present, inventive aspect of the disclosure providing a pending battle status listing facility) 703 and also list battles which are open for and available for voting 704. These battles may be grouped by various divisions (see FIG. 22, which is of a web page screen interface illustrating one, non-limiting example, present, inventive aspect of the disclosure providing a battle status listing facility, which may list such information by division and according to any specified criteria) 707. It should be noted that the divisions may span geographies, music genre, relative rankings of users, and/or numerous other criteria that may be saved in a division profile record. Upon listing the battles available for voting 704, the system may obtain a list of battles the user has already voted for from a database 705. This may be achieved by searching for records specifying the user's name to obtain votes cast entries. The system will then mark open battles that the user has already voted in 706, thus the system will also prevent the user from voting multiple times with regard to the same battle.

Figure 8:
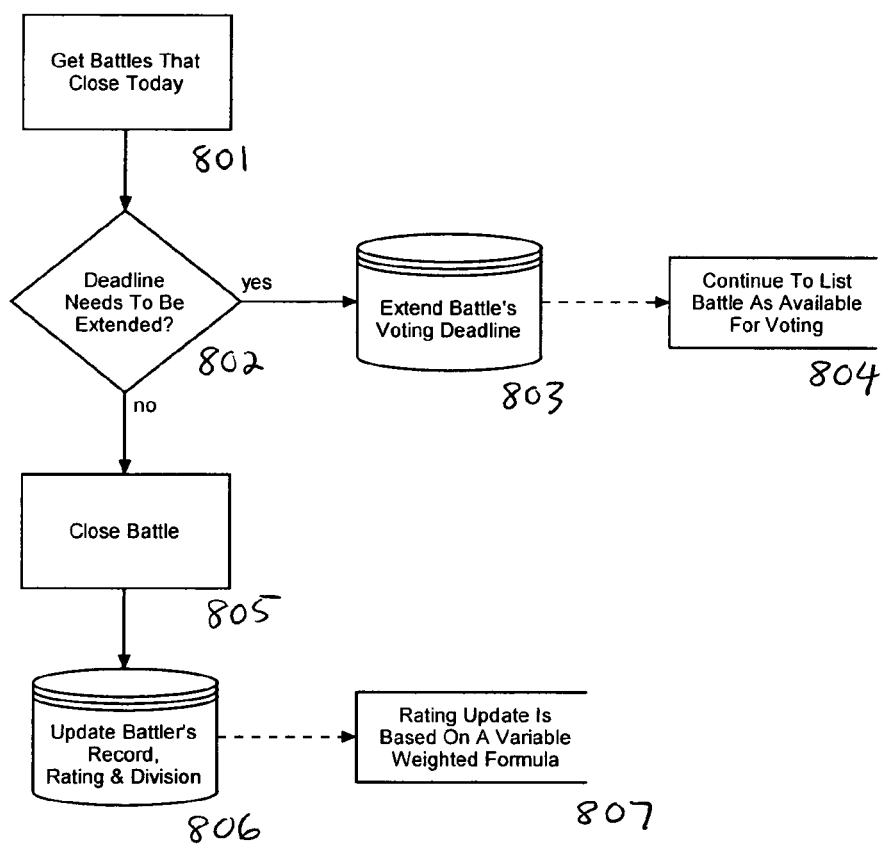
FIG. 8 is of a flow diagram illustrating one, non-limiting example, present, inventive aspect of the disclosure providing a facility to close a battle.

FIG. 8 is of a flow diagram illustrating one, non-limiting example, present, inventive aspect of the disclosure providing a facility to close a battle. Initially, the system obtains battles that are to be closed on a given day 801. The system will then determine if any deadlines need to be extended 802. For example, deadlines may be extended if not enough voters have viewed or voted on a creative work. If the deadline needs to be extended 802, the record of the battle is obtained from the database and its deadline is extended to allow more voting 803, e.g., by changing a value in a battle end date field. This will result in the battle still being listed as being available for voting 804. If the deadline does not need to be extended 802, then the battle will be closed 805. Upon closing the battle 805, the system will update the participants' records, ratings and division information resulting from the voting in the battle by spectators 806. The rating may vary and be based on a weighted formula as has already been discussed above 807. Furthermore, the rating for both the author and creative work may be updated.

Figure 9:
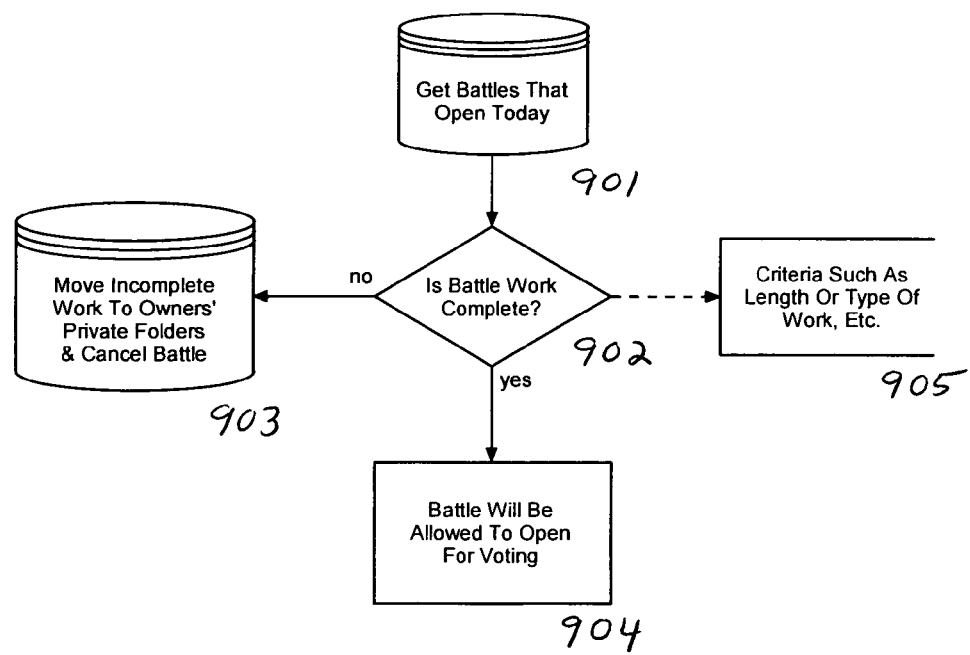
FIG. 9 is of a flow diagram illustrating one, non-limiting example, present, inventive aspect of the disclosure providing a daily processing facility.

FIG. 9 is of a flow diagram illustrating one, non-limiting example, present, inventive aspect of the disclosure providing a daily processing facility. Such a daily process facility may prevent incomplete battles from opening. Initially, the system obtains battles that are open for that day from a database 901. The system will then determine if a creative work is complete and ready for battle/voting 902. If the work is not complete 902, the creative work will be moved to user's private folder and the battle will be cancelled 903. The user's private folder may be embodied as a record on the database storing the creative work; the record, thus, identifies the user with the user's name and provides queryable entry describing the work, e.g., in the description of the creative work field. If the battle work is complete 902, the battle will open for voting 904. In one example embodiment, this may be achieved by marking the battle and creative works as open for voting in the database and upon querying the database for such open battles, publishing a list of such battles to a web page through the information server. Criteria such as length or the type of work may be used to determine if the creative work is complete 905 as has already been discussed.

Figure 23:
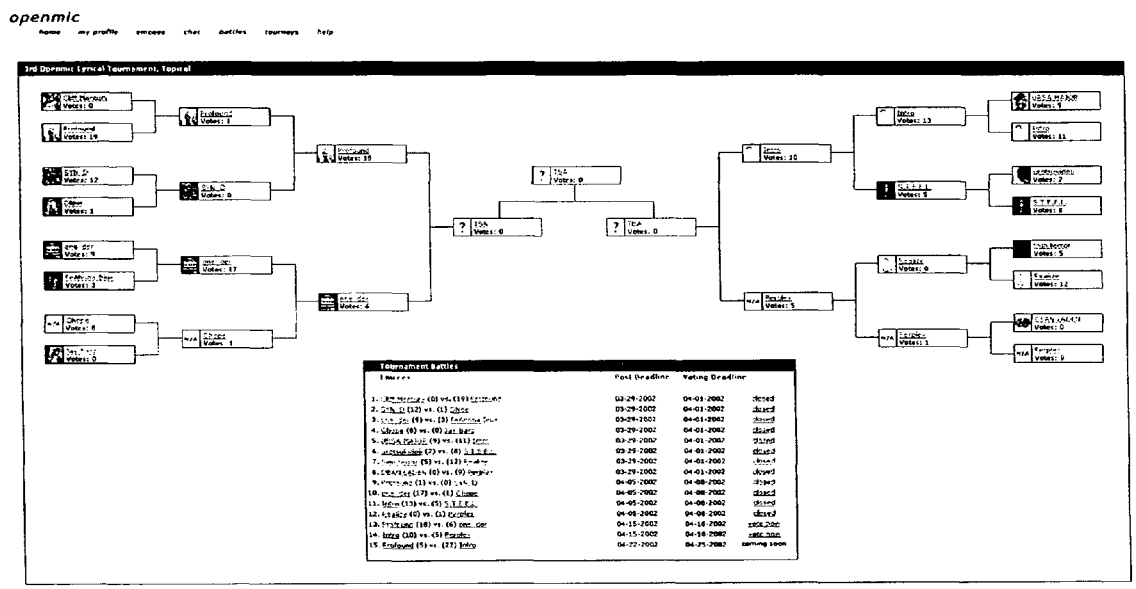
FIG. 23 is of a web page screen interface illustrating one, non-limiting example, present, inventive aspect of the disclosure providing a tournament status listing facility.

FIG. 10A is of a flow diagram illustrating one, non-limiting example, present, inventive aspect of the disclosure providing a tournaments facility. Participants of a tournament may be selected in various manners, including: an open registration 1001, wherein any users that wish to may enter the competition; hand selection 1002, wherein an administrator or spectators may select two users and/or two users themselves may choose to battle with one another; rankings 1003, wherein the ranking, division and/or other criteria may be used to match users to engage in a tournament competition. Although three types of participant selection mechanisms are illustrated 1004, numerous criteria may be used in which to select participants in a tournament, which are only limited by the types of criteria stored in the systems database. For each type of participant selection, there may be numerous ways to pair the selected participants against one another, including: randomly pairing opponents against one another 1005; hand pairing among the selected participants as to which particular opponents are to compete against one another 1006; or pairing by criteria such as rank, division, geography, etc. automatically 1007. Once a given set of opponents is selected 1001-1008, the system stores each round of battles in the database 1009. Individual participants then submit their creative works 1010 and they must do so within the guidelines established for the battle 1011, e.g., within time limits. Upon submitting the work 1010, the system makes the battle available for voting 1012. In one non-limiting example embodiment, only qualified members are allowed to vote 1018. It should be noted that numerous criteria may be established to limit the qualifying pool of voters, which also limited only by the types of criteria stored in the system's database. Upon making the battles available for voting 1012 and obtaining votes, then the system closes the battles 1013. The system then updates the records of the battlers and the battles for the tournament round 1014 in the systems database. Upon updating data base records for the various divisions 1014, the system then determines the type of tournament round that was updated 1022. If the round is of a single elimination type of tournament 1022, then the winner of each battle round is a advanced to the next round 1020. Advancing winners may be achieved by automatically inviting them to battle with another opponent (who also was a victor in a tournament battle round) while not extending such an automatic offer to battle to battle round losers. However, if the tournament is of a round robin type 1022, the top battlers from each group are advanced 1021. Advancing top battlers may be achieved by automatically inviting the top scoring battlers to battle with other top scoring tournament battlers while not extending such an automatic offer to battle to lower scoring tournament battlers. Upon advancing winners from previous rounds 1021, 1020, the system determines if the last round of the tournament has been reached 1015. For example, this may be determined by examining if there are only two battlers remaining. If it is not the last round, the system stores each round of battles in the database 1009 and tournament will continue. If the last round of the tournament has been reached 1015, then the tournament will be marked as closed and the winner will be announced 1017. This is achieved by changing database records to reflect the tournament is closed and making note of the winner in the database. After so doing, the system may update web pages through the information server to reflect the updated status of the tournament (see FIG. 23, which is of a web page screen interface illustrating one, non-limiting example, present, inventive aspect of the disclosure providing a tournament status listing facility). Alternatively, a cron job periodically may retrieve information from the database and update the web pages to show the latest ranking, battle status, tournament status, etc.

Figure 10B:
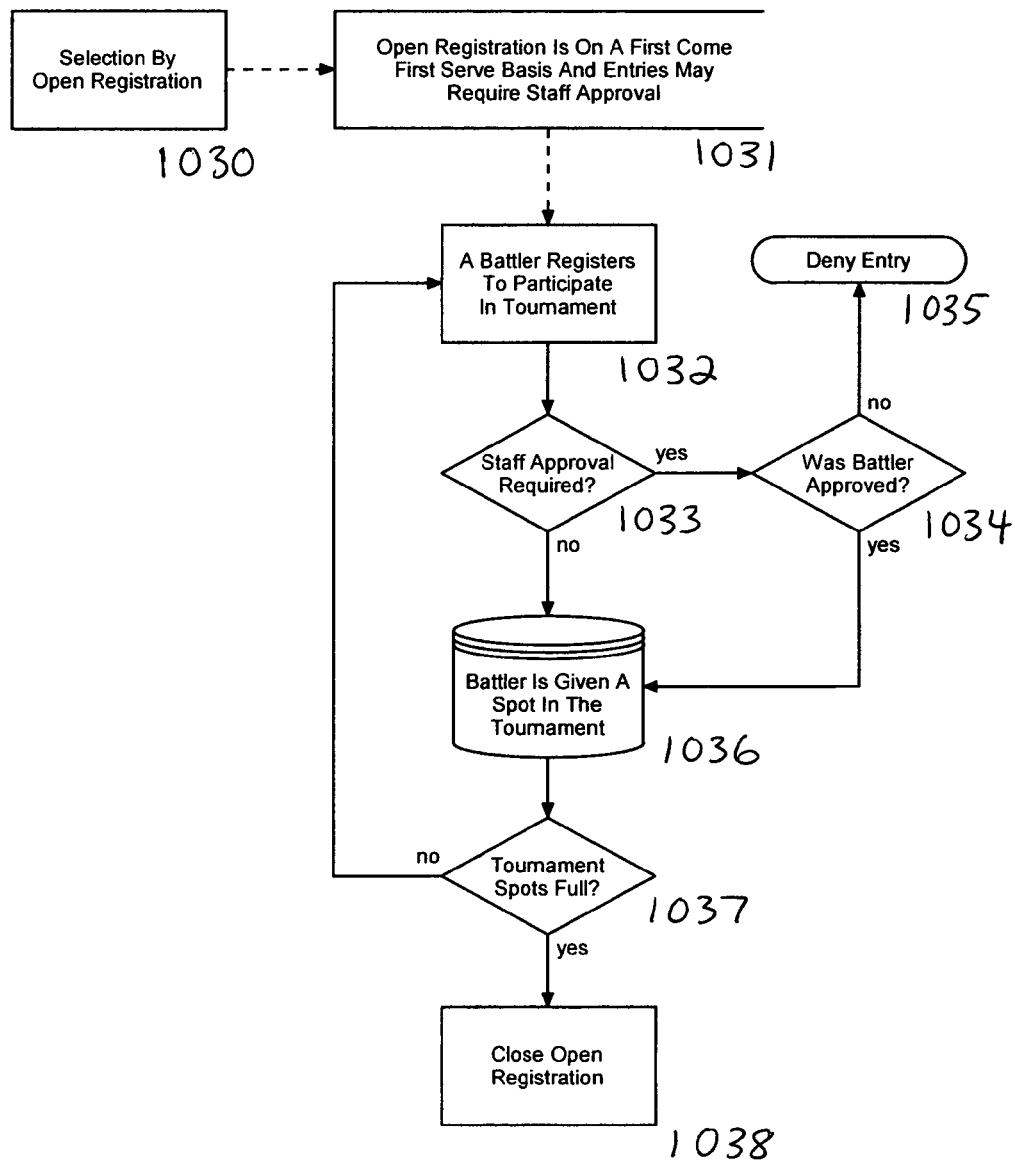
FIG. 10B is of a flow diagram illustrating one, non-limiting example, present, inventive aspect of the disclosure providing greater detail of the open registration facility.

FIG. 10B is of a flow diagram illustrating one, non-limiting example, present, inventive aspect of the disclosure providing greater detail of the open registration facility discussed in FIG. 10A, 1001. Generally, an open registration process allows any user to enter in a tournament. However, even in an open registration process, registration may be limited on a first come first serve basis and certain entries may even require administrative approval 1031. A participant, i.e., a battler, may register to participate in a tournament by filling out entries in a web form 1032, if staff approval is required 1033, the system will determine if the battler was approve by administration or criteria 1034; this may be achieved by holding the applicants registration until an actual administrator approves the process, or by pre-approving the user based on comparisons of various criteria. If the battler was not approved 1034, then entry into the tournament is denied 1035. If the battler is approved 1034 or if no approval is required for tournament entry 1033, then the system provides the tournament applicant with an entry in the tournament 1036. This is achieved by creating a record in the database for a battle including the users unique identifier, i.e., the user's name 1036. If the tournament has limited capacity and no more tournament spots are available for applicants 1037, then registration is closed and no further participants are allowed in the tournament 1038. Registration may be closed by changing the value in the tournament database records flagging that no more battlers may join. The tournament participant capacity may be specified by a tournament administrator, i.e., by placing a limit on the number of battlers in the database record, the system then reads and uses the limit to determine if the total number of participants attempting to join a tournament been reached 1037. If the tournament has not reached capacity with regard to participants 1037, then the system may once again accept further registrations from applicants 1032.

Figure 10C:
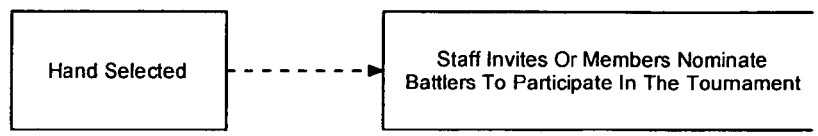
FIG. 10C is of a flow diagrams illustrating non-limiting example, present, inventive aspect of the disclosure providing greater detail regarding tournament hand selection.

FIG. 10C is of a flow diagrams illustrating non-limiting example, present, inventive aspect of the disclosure providing greater detail regarding tournament hand selection as has been already been discussed in FIG. 10A, 1002.

Figure 10D:
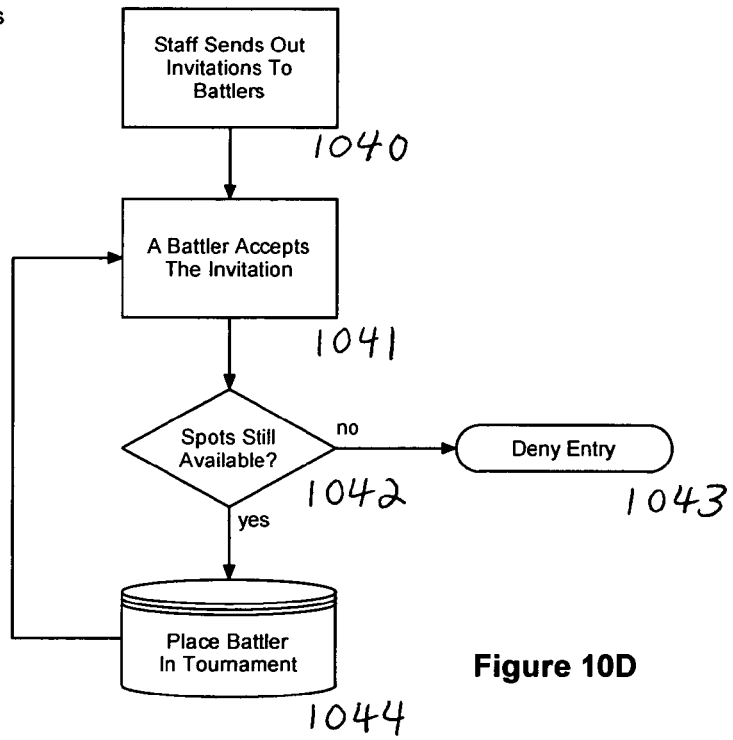
FIG. 10D is of a flow diagram illustrating one, non-limiting example, present, inventive aspect of the disclosure of hand selecting participants through invitations.

FIG. 10D is of a flow diagram illustrating one, non-limiting example, present, inventive aspect of the disclosure of hand selecting participants through invitations. Initially, administrators or the system may send out invitations to various battlers 1040. In one embodiment e-mail may be used to invitations to battlers with a link to the registration page as has been already discussed in FIG. 10B 1032. Upon engaging the registration page via hyperlink in the e-mail, the battle may accept the invitation 1041. Alternatively, invitations may be sent (see FIG. 12) and accepted (see FIG. 13) via the system through a web interface. The system will then determine if slots are available in the tournament 1042 and deny entry if there are exist 1043. If there is still room in the tournament 1042, the battler will be entered 1044.

Figure 10E:
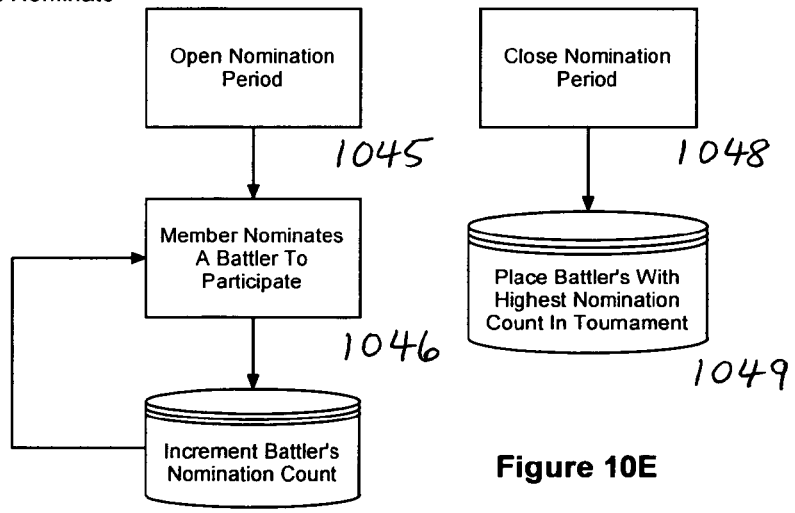
FIG. 10E is of a flow diagram illustrating one, non-limiting example, present, inventive aspect of the disclosure of system members nominating participants for a tournament.
Figure 10F:
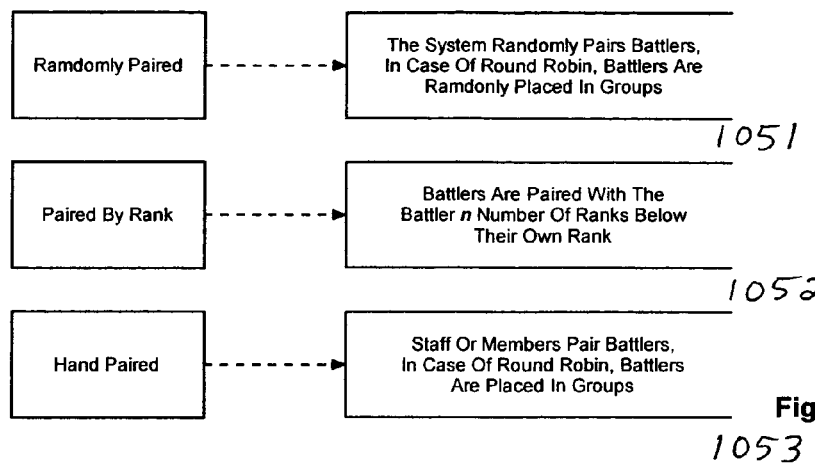

FIG. 10E is of a flow diagram illustrating one, non-limiting example, present, inventive aspect of the disclosure of system members nominating participants for a tournament. Initially, an open nomination period is established 1045. Such a period may be established by specifying a period of time for tournament nominations in a database record, which is read by the system and allows for users to submit the user names of nominees. Members may nominate various participants by submitting their names through e-mail and/or through web forms 1046 as has already been discussed. The various nominations are received in the system and are parsed; subsequently the nominations are used to increment battlers' nomination count for a particular tournament 1047, e.g., by increasing a votes received count for a user tournament record. Upon the expiration of the nomination period 1048, the system then enters battlers with the highest nomination counts into the tournament 1049.

FIGS. 10E-10H are of flow diagrams illustrating non-limiting example, present, inventive aspects of the disclosure providing greater detail to tournament paring of participants, i.e., battlers, as has been discussed in FIG. 10A, 1005-1008. Random paring of battlers may simply be chosen by the system 1051. In the case of a round robin tournament, the battles are placed into tournament groups through random selections. In an alternative embodiment, battlers may be paired by ranking 1052. In a by ranking pairing, battlers may be paired within a specified ranking range. In one example embodiment, this may be achieved by examining the database for users with a ranking within the specified range 1052 by query. In another alternative embodiment, tournament participants may be paired through hand selection 1053. Administrators or system users may pair battlers as was done through nomination. In a case of round robin tournament, selected battlers are placed in groups.

Figure 10G:
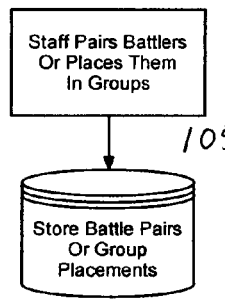

FIG. 10G is of a flow diagram illustrating one, non-limiting example, present, inventive aspect of the disclosure of administrator pairing of participants for tournament. An administrator may select battlers and place them in specified groups 1054. Upon selecting participants 1054, the system may then store the battler pairs or groups for placement into the tournament 1055.

Figure 10H:
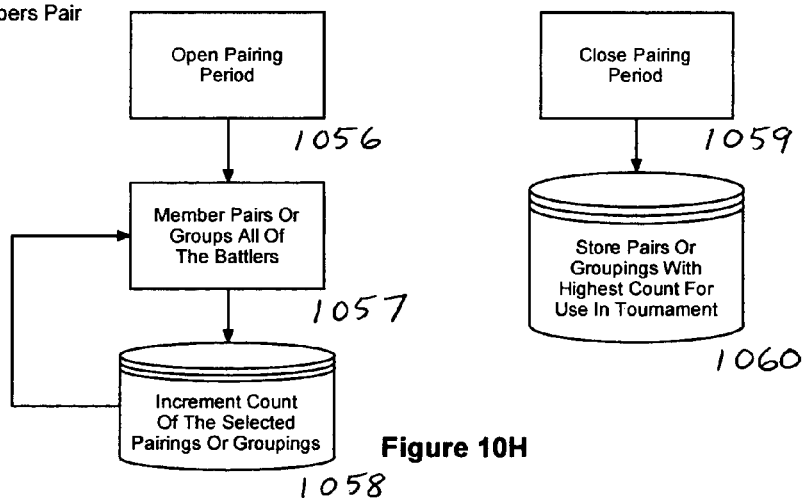

FIG. 10H is of a flow diagram illustrating one, non-limiting example, present, inventive aspect of the disclosure of system users selecting parings for participants in a tournament. Initially, a period of time is specified in which users may pair battlers 1056. During this time, users may pair certain battlers and/or groups together for participation tournament 1057. In an alternative embodiment, entire divisions may also be paired. Upon selecting users for a tournament 1057, the system increments a count for a particular pairing or grouping 1058. This is achieved by receiving an indication of a specific user or users that for a desired pairing. This process may iterate 1057, 1058. Users making these selections may provide the system with unique identifiers for battlers and these unique identifiers are used to search the database. The system then increments counts for the specified pairing for a particular tournament and stores the count in a database record. Upon the ending of the pairing period 1059, the system will store all the pairs or groupings with the highest count in a new tournament record 1060. This record, subsequently, may be used to offer invitations to battlers and manage a given tournament.

Figure 10J:
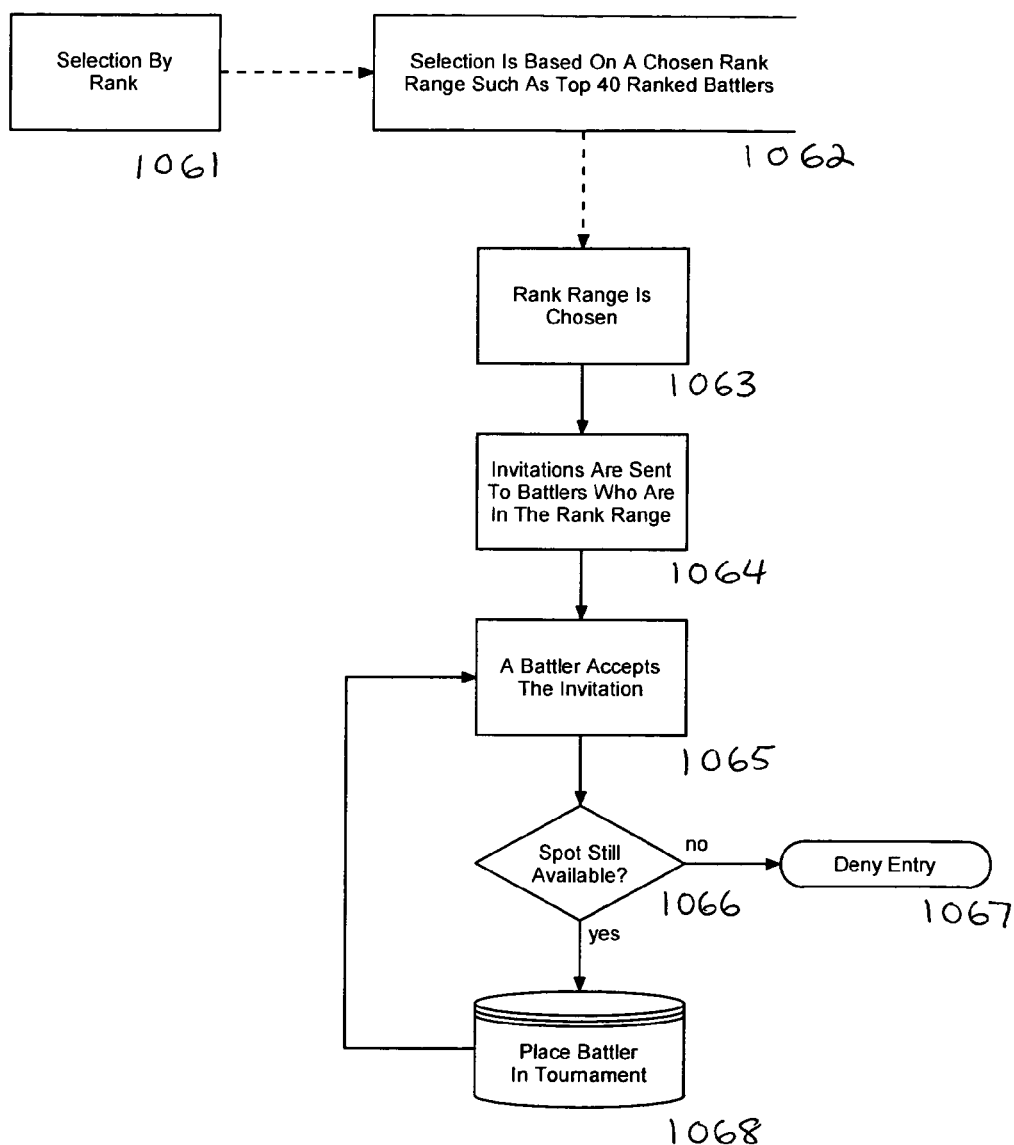
FIG. 10J is of a flow diagram illustrating one, non-limiting example, present, inventive aspect of the disclosure providing greater detail of tournament participation selection.

FIG. 10J is of a flow diagram illustrating one, non-limiting example, present, inventive aspect of the disclosure providing greater detail of tournament participation selection as has already been discussed in FIG. 10A, 1007. Selection may be based on various criteria, e.g., rank 1061, which are saved and tracked in the system's database 1062. For example, a range may be specified for the top 40 ranked battlers for a particular geographical range or an particular battling division 1062 (see FIG. 18, which is of a web page screen interface illustrating one, non-limiting example, present, inventive aspect of the disclosure providing a top 40 listing of competitors, which may be limited to specified regions). Thus, initially a ranking range is chosen by an administrator or a user member 1063. Upon identifying a range 1063, invitations are sent out to the battlers that fall within the ranking range 1064. A range and other criteria may be specified through a database query. Alternatively, a web page interface may be provided with check boxes and text fields to allow for the specification of various criteria which are then provided to the databases via a information server 1064. Upon a battler's acceptance of an invitation 1065, the system determines if there is still a slot available in the tournament 1066. If no slot is available, entry into the tournament for applicants is denied 1067. If slots are available 1066, then the applicant is entered in the tournament 1068. The applicant may be placed in the tournament by updating user records in the database and adding the user's unique identifier into a particular battle database record 1068.

Figure 10K:
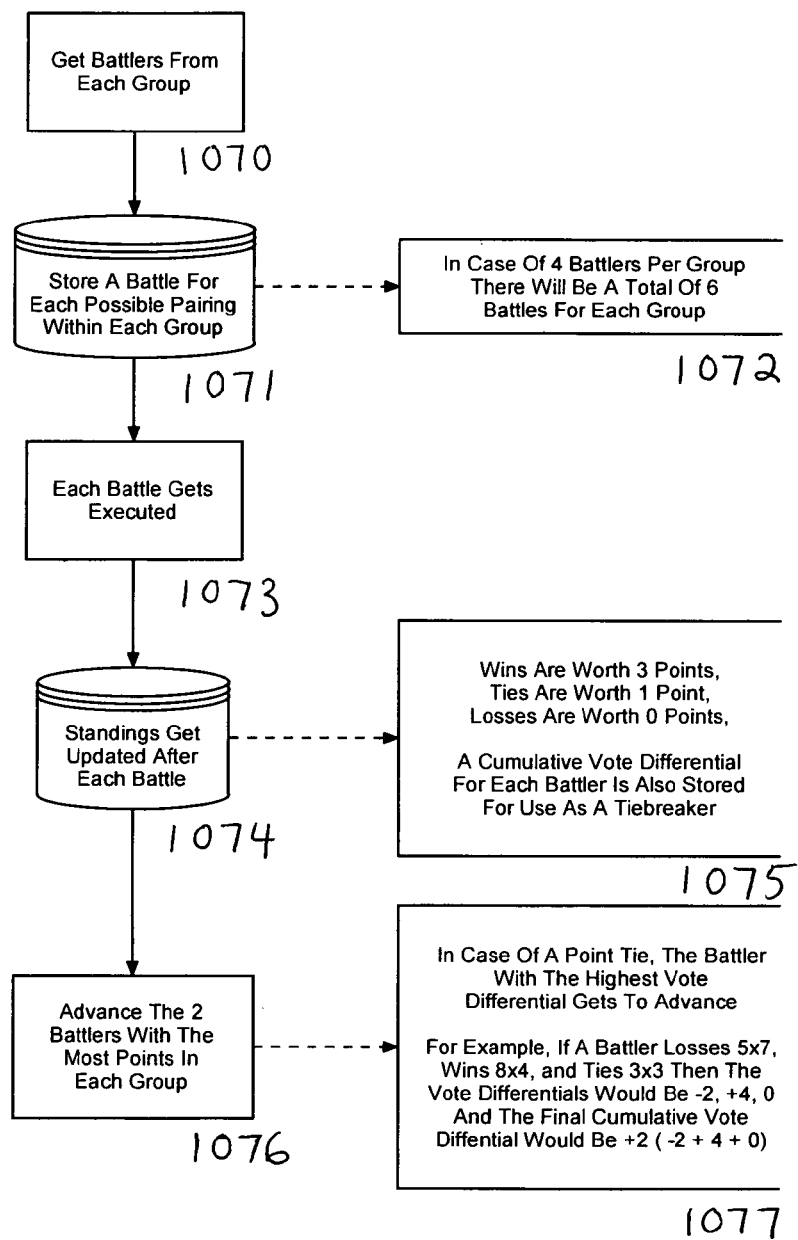
FIG. 10K is of a flow diagram illustrating one, non-limiting example, present, inventive aspect of the disclosure of round robin element elimination for a tournament.

FIG. 10K is of a flow diagram illustrating one, non-limiting example, present, inventive aspect of the disclosure of round robin element elimination for a tournament. Battlers are obtained for each group in the round robin tournament 1070. Numerous manners of selection of the groups has already been discussed. A battle is created for each pairing within each group 1071. Thus, in a case of four battlers per group, there will be a total six battles for each group to establish a winner 1072. Thus, the system will create enough database battle records to account for the various pairings required in the round robin elimination tournament 1072. Upon creating a battle record for each possible pairing, each battle will get executed in turn 1073. Upon completion of the each battle, the results from the battle are updated 1074 in the database. In one non-limiting example embodiment, winning a tournament are worth three points, ties are worth one point, and losses are worth zero points 1075. Of course various point structures may be designed for a given tournament. Also, votes and/or vote differentials may be stored for each user and battle, which may be employed to break tournament ties 1075. Upon updating the result of each battle 1074, the battlers with the most points in each grouping of the round robin tournament will advance 1076. In the case of a tie by tournament points, the battlers with the highest vote count will be allow to advance to the next round. For example, if a battler loses in votes 5 to 7 in round one, then wins the next round 8 to 4, and ties in the third round 3 to 3, then the vote differential will be (−2, +4, +0) or 2 and the cumulative vote differential is 2*(−2, +4, +0) or 4.

Figure 11:
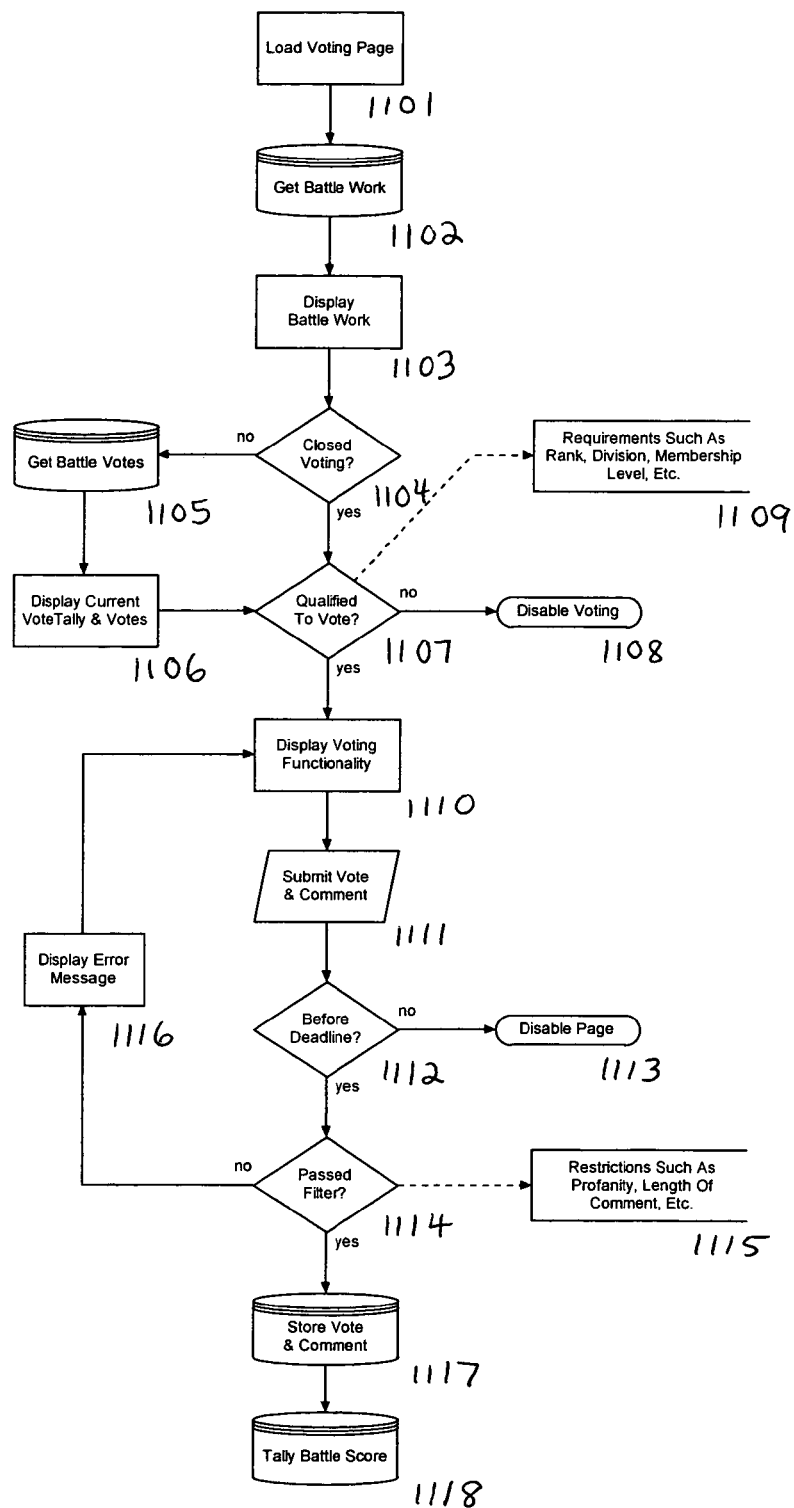
FIG. 11 is of a flow diagram illustrating one, non-limiting example, present, inventive aspect of the disclosure providing a battle voting facility.

FIG. 11 is of a flow diagram illustrating one, non-limiting example, present, inventive aspect of the disclosure providing a battle voting facility. Initially, the system loads a voting page 1101. The system will then load a creative work for a battle from the database 1102. Upon loading the creative work 1102, the system provides creative work for the battle for display and/or performance 1103. Upon displaying the work, 1103, the system determines if the voting its qualified 1104. If the voting is not qualified, the system will obtain more votes for the battle 1105 and then display the current vote totals 1106. However, if voting is qualified 1104, the system will determine if voters are qualified to vote 1107. Voter qualifications may include requirements such as rank, division, membership, level, duration as a member, etc.; any of which can be used to qualify the voters 1109. If it is a qualified vote and the voter does not match the qualifying criteria 1107, voting is disabled for that user 1108. If the user is qualified to vote 1107, full voting functionality is displayed to the user 1110. The user may then employ the voting functionality 1110 and submit a vote and/or comment on a creative word for a given battle 1111 (see FIG. 20, which is of a web page screen interface illustrating one, non-limiting example, present, inventive aspect of the disclosure providing voting and commentary facility). Along with their vote, voters may provide commentary, which is saved by the system and may then be evaluated (see FIG. 21, which is of a web page screen interface illustrating one, non-limiting example, present, inventive aspect of the disclosure providing a battle commentary listing facility). Upon submitting their vote 1111, the system will determine if the vote has been obtained before the voting deadline 1112. If the vote has not been obtained before the deadline, the voting page is disabled 1113. If the vote was obtained before the deadline, the vote may be screened by a filter 1114 for restriction such as profanity, length of the comment, etc. 1115. If the vote does not pass the screening filter 1114, an error message may be displayed 1116 and a voting facility may once again be redisplayed to the user 1110 allowing for revision. If the vote does pass the screening filter 1114, the system may store the vote and comment in its database 1117. And the system may tally the scores for the battle 1118.

By storing such information voting and tournament information, users may view and engage in battles by various criteria. For example, FIG. 19, which is of a web page screen interface illustrating one, non-limiting example, present, inventive aspect of the disclosure provides a battle region selection facility, which allows users to limit their view of battles in specific regions.

It should be understood that the above description is only representative of illustrative embodiments. For the convenience of the reader, the above descriptions have focused on a representative sample of all possible embodiments, a sample that teaches the principles of the invention. The description has not attempted to exhaustively enumerate all possible variations. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that the embodiments and variations shown and described herein are merely illustrative of the principles of this invention and that various modifications may be implemented without departing from the scope and spirit of the invention.

In addition, the disclosure herein includes other inventions not presently claimed. Applicant reserves all rights in those presently unclaimed inventions including the right to claim such inventions, file additional applications, continuations, continuations in part, divisions, and/or the like thereof.

We claim:

1. A creative work evaluating processor-implemented method, comprising:

providing, via a processor, an offer to compete in a creative works competition by a first user, wherein the offer to compete includes parameters that specify a second user as a potential competitor, a permitted type of creative work to be evaluated in the competition, a permitted length of the creative works to be evaluated in the competition, a submission deadline for competitors to submit creative works, and voting parameters;

obtaining, via the processor, an acceptance to the offer to compete from the second user;

receiving, via the processor, a creative work from the first user and the second user after determining: (a) that the creative works from the first user and the second user match the permitted type of creative work specified by the first user in the offer to compete, (b) that the creative works from the first user and the second user do not exceed the permitted length specified by the first user in the offer to compete, and (c) that the creative works from the first user and the second user were submitted before the submission deadline specified by the first user in the offer to compete;

providing, via the processor, the creative works from the first user and the second user to an audience;

obtaining, via the processor, votes from members of the audience experiencing the creative works of the first user and the second user;

totaling, via the processor and in response to the voting parameters specified by the first user in the offer to compete being satisfied, votes for each creative work;

determining, based on the totaled votes for each creative work, a winner of the creative works competition between the first user and the second user;

updating a rating for the first user and the second user based on the following formula:

$$R_n = R_o + K(W - (1/(1+10^{D/S}))), \text{ wherein:}$$

$R_n$ represents the updated rating;

$R_o$ represents a rating for the user before the creative works competition;

K represents a predetermined weighting factor that rewards more rating points to users with lower $R_o$ values;

W represents the outcome of the creative works competition and rewards more rating points to a user for a win than for a tie, and more points for a tie than a loss;

D represents the absolute difference between $R_o$ values for the first user and the second user; and S represents a predetermined value that weights the difference between $R_o$ values for the first user and the second user; and ranking the first user and the second user along with a plurality of other users according to the updated ratings.

2. The method of claim 1, wherein the creative works competition is a tournament.

3. The method of claim 1, further comprising, generating an offer to compete, prior to providing the offer to compete.

4. The method of claim 1, wherein the offer to compete is over creative works.

5. The method of claim 1, wherein the offer to compete is upon request of an offering competitor.

6. The method of claim 1, further comprising, selecting potential competitors for the offer to compete, prior to providing the offer to compete.

7. The method of claim 6, wherein selection for the offer to compete is limited by qualification.

8. The method of claim 7, wherein the qualifications are for potential competitors.

9. The method of claim 7, wherein the qualifications are for creative works.

10. The method of claim 7, wherein qualification is based on hand-selection.

11. The method of claim 10, wherein hand-selection is made by an audience.

12. The method of claim 10, wherein hand-selection is made by a division.

13. The method of claim 7, wherein qualification is random.

14. The method of claim 7, wherein qualifications are based on criteria stored in a database.

15. The method of claim 14, wherein the criteria includes membership in a division.

16. The method of claim 15, wherein membership in a division is based on geography.

17. The method of claim 15, wherein membership in a division is based on ranking.

18. The method of claim 14, wherein criteria includes a ranking.

19. The method of claim 14, wherein criteria includes demographics.

20. The method of claim 6, wherein selected competitors are paired at random.

21. The method of claim 6, wherein selected competitors are paired in a round-robin manner.

22. The method of claim 6, wherein selected competitors are paired through hand-selection.

23. The method of claim 6, wherein selected competitors are paired through the issuance of an offer to compete and the acceptance of the offer to compete.

24. The method of claim 22, wherein hand-selection is made by an audience.

25. The method of claim 1, wherein the offer to compete is provided to a plurality of potential competitors.

26. The method of claim 1, wherein the acceptance of the offer to compete is configured as a request to issue an offer to compete.

27. The method of claim 1, wherein the first user and the second user may not view one another's creative works until the creative works are ready for providing to the audience.

28. The method of claim 1, wherein the first user and the second user have a limited time in which to provide creative works.

29. The method of claim 1, wherein the first user and the second user may employ feedback from audience members to update their creative work.

30. The method of claim 1, wherein the first user and the second user are paired at random.

31. The method of claim 1, wherein the first user and the second user are paired in a round-robin manner.

32. The method of claim 1, wherein the first user and the second user are paired through hand-selection.

33. The method of claim 1, wherein the first user and the second user are paired through the issuance of an offer to compete and the acceptance of the offer to compete.

34. The method of claim 1, wherein audience members are limited by qualifications.

35. The method of claim 34, wherein qualification is based on hand-selection.

36. The method of claim 35, wherein hand-selection is made by a division.

37. The method of claim 34, wherein qualification is random.

38. The method of claim 34, wherein qualifications are based on criteria stored in a database.

39. The method of claim 38, wherein the criteria includes membership in a division.

40. The method of claim 39, wherein membership in a division is based on geography.

41. The method of claim 39, wherein membership in a division is based on ranking.

42. The method of claim 38, wherein criteria includes a ranking.

43. The method of claim 38, wherein criteria includes demographics.

44. The method of claim 1, wherein the audience provides feedback to the first user and the second user.

45. The method of claim 1, wherein the winner is provided to the audience.

46. The method of claim 1, wherein rankings are adjusted for creative works.

47. The method of claim 1, wherein ranking the first user and the second user is also based on current rankings of the creative works.

48. The method of claim 1, wherein ranking the first user and the second user is also based on the format of the creative works.

49. The method of claim 1, wherein ranking the first user and the second user is also based on criteria stored in a database.

50. The method of claim 49, wherein the criteria includes membership in a division.

51. The method of claim 49, wherein the criteria includes demographics.

52. The method of claim 1, wherein the voting parameters include a parameter to set a condition that the audience can vote for a first user specified number of days.

53. The method of claim 1, wherein the voting parameters include a parameter to set a condition that the audience can vote until a first user specified number of votes is reached.

54. The method of claim 1, wherein the audience includes any public persons.

55. The method of claim 1, wherein the audience includes a panel of judges.

56. A creative work evaluating processor-implemented system, comprising:
  means to provide an offer to compete in a creative works competition by a first user, wherein the offer to compete includes parameters that specify a second user as a potential competitor, a permitted type of creative work to be evaluated in the competition, a permitted length of the creative works to be evaluated in the competition, a submission deadline for competitors to submit creative works, and voting parameters;
  means to obtain an acceptance to the offer to compete from the second user;
  means to receive a creative work from the first user and the second user after determining: (a) that the creative works from the first user and the second user match the permitted type of creative work specified by the first user in the offer to compete, (b) that the creative works from the first user and the second user do not exceed the permitted length specified by the first user in the offer to compete, and (c) that the creative works from the first user and the second user were submitted before the submission deadline specified by the first user in the offer to compete;

means to provide the creative works from the first user and the second user to an audience;

means to obtain votes from members of the audience experiencing the creative works of the first user and the second user;

means to total, via a processor and in response to the voting parameters specified by the first user in the offer to compete being satisfied, votes for each creative work;

means to determine, based on the totaled votes for each creative work, a winner of the creative works competition between the first user and the second user;

means to update a rating for the first user and the second user based on the following formula:

$R_n = R_o + K(W - (1/(1+10^{D/S})))$, wherein:

$R_n$ represents the updated rating;

$R_o$ represents a rating for the user before the creative works competition;

K represents a predetermined weighting factor that rewards more rating points to users with lower $R_o$ values;

W represents the outcome of the creative works competition and rewards more rating points to a user for a win than for a tie, and more points for a tie than a loss;

D represents the absolute difference between $R_o$ values for the first user and the second user; and S represents a predetermined value that weights the difference between $R_o$ values for the first user and the second user; and means to rank the first user and the second user along with a plurality of other users according to the updated ratings.

57. The system of claim 56, wherein the creative works competition is a tournament.

58. The system of claim 56, further comprising, means to generate an offer to compete, prior to providing the offer to compete.

59. The system of claim 56, wherein the offer to compete is over creative works.

60. The system of claim 56, wherein the offer to compete is upon request of an offering competitor.

61. The system of claim 56, further comprising, means to select potential competitors for the offers to compete, prior to providing the offer to compete.

62. The system of claim 61, wherein selection for the offer to compete is limited by qualification.

63. The system of claim 62, wherein the qualifications are for potential competitors.

64. The system of claim 62, wherein the qualifications are for creative works.

65. The system of claim 62, wherein qualification is based on hand-selection.

66. The system of claim 65, wherein hand-selection is made by an audience.

67. The system of claim 62, wherein hand-selection is made by a division.

68. The system of claim 62, wherein qualification is random.

69. The system of claim 62, wherein qualifications are based on criteria stored in a database.

70. The system of claim 69, wherein the criteria includes membership in a division.

71. The system of claim 70, wherein membership in a division is based on geography.

72. The system of claim 70, wherein membership in a division is based on ranking.

73. The system of claim 69, wherein criteria includes a ranking.

74. The system of claim 69, wherein criteria includes demographics.

75. The system of claim 61, wherein selected competitors are paired at random.

76. The system of claim 61, wherein selected competitors are paired in a round-robin manner.

77. The system of claim 61, wherein selected competitors are paired through hand-selection.

78. The system of claim 61, wherein selected competitors are paired through the issuance of an offer to compete and the acceptance of the offer to compete.

79. The system of claim 77, wherein hand-selection is made by an audience.

80. The system of claim 56, wherein the offer to compete is provided to a plurality of potential competitors.

81. The system of claim 56, wherein the acceptance of the offer to compete is configured as a request to issue an offer to compete.

82. The system of claim 56, wherein the first user and the second user may not view one another's creative works until the creative works are ready for providing to the audience.

83. The system of claim 56, wherein the first user and the second user have a limited time in which to provide creative works.

84. The system of claim 56, wherein the first user and the second user may employ feedback from audience members to update their creative work.

85. The system of claim 56, wherein the first user and the second user may employ feedback from audience members to update their creative work.

86. The system of claim 56, wherein the first user and the second user are paired at random.

87. The system of claim 56, wherein the first user and the second user are paired in a round-robin manner.

88. The system of claim 56, wherein the first user and the second user are paired through hand-selection.

89. The system of claim 56, wherein the first user and the second user are paired through the issuance of an offer to compete and the acceptance of the offer to compete.

90. The system of claim 56, wherein audience members are limited by qualifications.

91. The system of claim 90, wherein qualification is based on hand-selection.

92. The system of claim 91, wherein hand-selection is made by a division.

93. The system of claim 90, wherein qualification is random.

94. The system of claim 90, wherein qualifications are based on criteria stored in a database.

95. The system of claim 94, wherein the criteria includes membership in a division.

96. The system of claim 95, wherein membership in a division is based on geography.

97. The system of claim 95, wherein membership in a division is based on ranking.

98. The system of claim 94, wherein criteria includes a ranking.

99. The system of claim 94, wherein criteria includes demographics.

100. The system of claim 56, wherein the audience provides feedback to the first user and the second user.

101. The system of claim 56, wherein the winner is provided to the audience.

102. The system of claim 56, wherein rankings are adjusted for creative works.

103. The system of claim 56, wherein ranking the first user and the second user is also based on current rankings of the creative works.

104. The system of claim 56, wherein ranking the first user and the second user is also based on the format of the creative works.

105. The system of claim 56, wherein ranking the first user and the second user is also based on criteria stored in a database.

106. The system of claim 105, wherein the criteria includes membership in a division.

107. The system of claim 105, wherein the criteria includes demographics.

108. A non-transitory computer-readable medium readable by a processor to evaluate a creative work, comprising:
instructions stored in the processor readable medium, wherein the instructions are issuable by the processor to:
provide an offer to compete in a creative works competition by a first user, wherein the offer to compete includes parameters that specify a second user as a potential competitor, a permitted type of creative work to be evaluated in the competition, a permitted length of the creative works to be evaluated in the competition, a submission deadline for competitors to submit creative works, and voting parameters;
obtain an acceptance to the offer to compete from the second user;
receive a creative work from the first user and the second user after determining: (a) that the creative works from the first user and the second user match the permitted type of creative work specified by the first user in the offer to compete, (b) that the creative works from the first user and the second user do not exceed the permitted length specified by the first user in the offer to compete, and (c) that the creative works from the first user and the second user were submitted before the submission deadline specified by the first user in the offer to compete;
provide the creative works from the first user and the second user to an audience;
obtain votes from members of the audience experiencing the creative works of the first user and the second user;
total, in response to the voting parameters specified by the first user in the offer to compete being satisfied, votes for each creative work;
determine, based on the totaled votes for each creative work, a winner of the creative works competition between the first user and the second user;
update a rating for the first user and the second user based on the following formula:

$R_n = R_o + K(W - (1/(1+10^{D/S})))$, wherein:

$R_n$ represents the updated rating;
$R_o$ represents a rating for the user before the creative works competition;
K represents a predetermined weighting factor that rewards more rating points to users with lower $R_o$ values;
W represents the outcome of the creative works competition and rewards more rating points to a user for a win than for a tie, and more points for a tie than a loss;
D represents the absolute difference between $R_o$ values for the first user and the second user; and
S represents a predetermined value that weights the difference between $R_o$ values for the first user and the second user; and
rank the first user and the second user along with a plurality of other users according to the updated ratings.

109. The medium of claim 108, wherein the creative works competition is a tournament.

110. The medium of claim 108, further comprising, generate an offer to compete, prior to providing the offer to compete.

111. The medium of claim 108, wherein the offer to compete is over creative works.

112. The medium of claim 108, wherein the offer to compete is upon request of an offering competitor.

113. The medium of claim 108, further comprising,
select potential competitors for the offer to compete, prior to providing the offer to compete.

114. The medium of claim 113, wherein selection for the offer to compete is limited by qualification.

115. The medium of claim 114, wherein the qualifications are for potential competitors.

116. The medium of claim 114, wherein the qualifications are for creative works.

117. The medium of claim 114, wherein qualification is based on hand-selection.

118. The medium of claim 117, wherein hand-selection is made by an audience.

119. The medium of claim 117, wherein hand-selection is made by a division.

120. The medium of claim 114, wherein qualification is random.

121. The medium of claim 114, wherein qualifications are based on criteria stored in a database.

122. The medium of claim 121, wherein the criteria includes membership in a division.

123. The medium of claim 122, wherein membership in a division is based on geography.

124. The medium of claim 122, wherein membership in a division is based on ranking.

125. The medium of claim 121, wherein criteria includes a ranking.

126. The medium of claim 121, wherein criteria includes demographics.

127. The medium of claim 113, wherein selected competitors are paired at random.

128. The medium of claim 113, wherein selected competitors are paired in a round-robin manner.

129. The medium of claim 113, wherein selected competitors are paired through hand-selection.

130. The medium of claim 113, wherein selected competitors are paired through the issuance of an offer to compete and the acceptance of the offer to compete.

131. The medium of claim 129, wherein hand-selection is made by an audience.

132. The medium of claim 108, wherein the offer to compete is provided to a plurality of potential competitors.

133. The medium of claim 108, wherein the acceptance of the offer to compete is configured as a request to issue an offer to compete.

134. The medium of claim 108, wherein the first user and the second user may not view one another's creative works until the creative works are ready for providing to the audience.

135. The medium of claim 108, wherein the first user and the second user have a limited time in which to provide creative works.

136. The medium of claim 108, wherein the first user and the second user may employ feedback from audience members to update their creative work.

137. The medium of claim 108, wherein the first user and the second user are paired at random.

138. The medium of claim 108, wherein the first user and the second user are paired in a round-robin manner.

139. The medium of claim 108, wherein the first user and the second user are paired through hand-selection.

140. The medium of claim 108, wherein the first user and the second user are paired through the issuance of an offer to compete and the acceptance of the offer to compete.

141. The medium of claim 108, wherein audience members are limited by qualifications.

142. The medium of claim 141, wherein qualification is based on hand-selection.

143. The medium of claim 142, wherein hand-selection is made by a division.

144. The medium of claim 141, wherein qualification is random.

145. The medium of claim 141, wherein qualifications are based on criteria stored in a database.

146. The medium of claim 145, wherein the criteria includes membership in a division.

147. The medium of claim 146, wherein membership in a division is based on geography.

148. The medium of claim 146, wherein membership in a division is based on ranking.

149. The medium of claim 145, wherein criteria includes a ranking.

150. The medium of claim 145, wherein criteria includes demographics.

151. The medium of claim 108, wherein the audience provides feedback to the first user and the second user.

152. The medium of claim 108, wherein the winner is provided to the audience.

153. The medium of claim 108, wherein rankings are adjusted for creative works.

154. The medium of claim 108, wherein ranking the first user and the second user is also based on current rankings of the creative works.

155. The medium of claim 108, wherein ranking the first user and the second user is also based on the format of the creative works.

156. The medium of claim 108, wherein ranking the first user and the second user is also based on criteria stored in a database.

157. The medium of claim 156, wherein the criteria includes membership in a division.

158. The medium of claim 156, wherein the criteria includes demographics.

159. An apparatus to evaluate a creative work, comprising:
a memory, the memory for storing instructions;
a processor that may issue a plurality of processing instructions stored in the memory, wherein the processor issues instructions to:
provide an offer to compete in a creative works competition by a first user, wherein the offer to compete includes parameters that specify a second user as a potential competitor, a permitted type of creative work to be evaluated in the competition, a permitted length of the creative works to be evaluated in the competition, a submission deadline for competitors to submit creative works, and voting parameters;
obtain an acceptance to the offer to compete from the second user;
receive a creative work from the first user and the second user after determining: (a) that the creative works from the first user and the second user match the permitted type of creative work specified by the first user in the offer to compete, (b) that the creative works from the first user and the second user do not exceed the permitted length specified by the first user in the offer to compete, and (c) that the creative works from the first user and the second user were submitted before the submission deadline specified by the first user in the offer to compete;
provide the creative works from the first user and the second user to an audience;
obtain votes from members of the audience experiencing the creative works of the first user and the second user;
total, in response to the voting parameters specified by the first user in the offer to compete being satisfied, votes for each creative work;
determine, based on the totaled votes for each creative work, a winner of the creative works competition between the first user and the second user;
update a rating for the first user and the second user based on the following formula:

$R_n = R_o + K(W - (1/(1+10^{D/S})))$, wherein:

$R_n$ represents the updated rating;
$R_o$ represents a rating for the user before the creative works competition;
K represents a predetermined weighting factor that rewards more rating points to users with lower $R_o$ values;
W represents the outcome of the creative works competition and rewards more rating points to a user for a win than for a tie, and more points for a tie than a loss;
D represents the absolute difference between $R_o$ values for the first user and the second user; and
S represents a predetermined value that weights the difference between $R_o$ values for the first user and the second user; and
rank the first user and the second user along with a plurality of other users according to the updated ratings.

160. The apparatus of claim 159, wherein the creative works competition is a tournament.

161. The apparatus of claim 159, further comprising, generate an offer to compete, prior to providing the offer to compete.

162. The apparatus of claim 159, wherein the offer to compete is over creative works.

163. The apparatus of claim 159, wherein the offer to compete is upon request of an offering competitor.

164. The apparatus of claim 159, further comprising,
select potential competitors for the offer to compete, prior to providing the offer to compete.

165. The apparatus of claim 164, wherein selection for the offer to compete is limited by qualification.

166. The apparatus of claim 165, wherein the qualifications are for potential competitors.

167. The apparatus of claim 165, wherein the qualifications are for creative works.

168. The apparatus of claim 165, wherein qualification is based on hand-selection.

169. The apparatus of claim 168, wherein hand-selection is made by an audience.

170. The apparatus of claim 168, wherein hand-selection is made by a division.

171. The apparatus of claim 165, wherein qualification is random.

172. The apparatus of claim 165, wherein qualifications are based on criteria stored in a database.

173. The apparatus of claim 172, wherein the criteria includes membership in a division.

174. The apparatus of claim 173, wherein membership in a division is based on geography.

175. The apparatus of claim 173, wherein membership in a division is based on ranking.

176. The apparatus of claim 172, wherein criteria includes a ranking.

177. The apparatus of claim 172, wherein criteria includes demographics.

178. The apparatus of claim 164, wherein selected competitors are paired at random.

179. The apparatus of claim 164, wherein selected competitors are paired in a round-robin manner.

180. The apparatus of claim 164, wherein selected competitors are paired through hand-selection.

181. The apparatus of claim 164, wherein selected competitors are paired through the issuance of an offer to compete and the acceptance of the offer to compete.

182. The apparatus of claim 180, wherein hand-selection is made by an audience.

183. The apparatus of claim 159, wherein the offer to compete is provided to a plurality of potential competitors.

184. The apparatus of claim 159, wherein the acceptance of the offer to compete is configured as a request to issue an offer to compete.

185. The apparatus of claim 159, wherein the first user and the second user may not view one another's creative works until the creative works are ready for providing to the audience.

186. The apparatus of claim 159, wherein the first user and the second user have a limited time in which to provide creative works.

187. The apparatus of claim 159, wherein the first user and the second user may employ feedback from audience members to update their creative work.

188. The apparatus of claim 159, wherein the first user and the second user are paired at random.

189. The apparatus of claim 159, wherein the first user and the second user are paired in a round-robin manner.

190. The apparatus of claim 159, wherein the first user and the second user are paired through hand-selection.

191. The apparatus of claim 159, wherein the first user and the second user are paired through the issuance of an offer to compete and the acceptance of the offer to compete.

192. The apparatus of claim 159, wherein audience members are limited by qualifications.

193. The apparatus of claim 192, wherein qualification is based on hand-selection.

194. The apparatus of claim 193, wherein hand-selection is made by a division.

195. The apparatus of claim 192, wherein qualification is random.

196. The apparatus of claim 192, wherein qualifications are based on criteria stored in a database.

197. The apparatus of claim 196, wherein the criteria includes membership in a division.

198. The apparatus of claim 197, wherein membership in a division is based on geography.

199. The apparatus of claim 197, wherein membership in a division is based on ranking.

200. The apparatus of claim 196, wherein criteria includes a ranking.

201. The apparatus of claim 196, wherein criteria includes demographics.

202. The apparatus of claim 159, wherein the audience provides feedback to the first user and the second user.

203. The apparatus of claim 159, wherein the winner is provided to the audience.

204. The apparatus of claim 159, wherein rankings are adjusted for creative works.

205. The apparatus of claim 159, wherein ranking the first user and the second user is also based on current rankings of the creative works.

206. The apparatus of claim 159, wherein ranking the first user and the second user is also based on the format of the creative works.

207. The apparatus of claim 159, wherein ranking the first user and the second user is also based on criteria stored in a database.

208. The apparatus of claim 207, wherein the criteria includes membership in a division.

209. The apparatus of claim 207, wherein the criteria includes demographics.

\* \* \* \* \*